(12) United States Patent
Kim et al.

(10) Patent No.: US 12,552,850 B2
(45) Date of Patent: Feb. 17, 2026

(54) GLP-1/GIP DUAL AGONIST, LONG-ACTING CONJUGATE THEREOF, AND PHARMACEUTICAL COMPOSITION COMPRISING SAME

(71) Applicant: HANMI PHARM. CO., LTD., Hwaseong-si (KR)

(72) Inventors: Eun Jung Kim, Hwaseong-si (KR); Jae Hyuk Choi, Hwaseong-si (KR); Nyeong Sang Yoo, Hwaseong-si (KR); Hyeon Joo Im, Hwaseong-si (KR); Sang Hyun Lee, Hwaseong-si (KR)

(73) Assignee: HANMI PHARM. CO., LTD., Hwaseong-si (KR)

( * ) Notice: Subject to any disclaimer, the term of this patent is extended or adjusted under 35 U.S.C. 154(b) by 508 days.

(21) Appl. No.: 18/031,978

(22) PCT Filed: Oct. 18, 2021

(86) PCT No.: PCT/KR2021/014462
§ 371 (c)(1),
(2) Date: Apr. 14, 2023

(87) PCT Pub. No.: WO2022/080986
PCT Pub. Date: Apr. 21, 2022

(65) Prior Publication Data
US 2023/0382970 A1 Nov. 30, 2023

(30) Foreign Application Priority Data
Oct. 16, 2020 (KR) .................. 10-2020-0134478

(51) Int. Cl.
*C07K 14/605* (2006.01)
*A61K 47/60* (2017.01)
*A61K 47/68* (2017.01)
*A61P 3/10* (2006.01)

(52) U.S. Cl.
CPC ............ *C07K 14/605* (2013.01); *A61K 47/60* (2017.08); *A61K 47/6811* (2017.08); *A61P 3/10* (2018.01)

(58) Field of Classification Search
CPC .......................... C07K 14/605; A61K 47/6811
See application file for complete search history.

(56) References Cited

U.S. PATENT DOCUMENTS

| 2012/0288511 A1 | 11/2012 | Dimarchi |
| 2016/0175400 A1 | 6/2016 | Vignati et al. |
| 2019/0218270 A1 | 7/2019 | Shelton et al. |
| 2020/0230250 A1 | 7/2020 | Park et al. |

FOREIGN PATENT DOCUMENTS

| JP | 2014-501762 A | 1/2014 |
| JP | 2015-524427 A | 8/2015 |
| JP | 2017-507124 A | 3/2017 |
| KR | 10-2014-0020851 A | 2/2014 |
| KR | 10-2016-0079875 A | 7/2016 |
| KR | 10-2018-0090760 A | 8/2018 |
| WO | 2012/088379 A2 | 6/2012 |
| WO | 2014/017843 A1 | 1/2014 |
| WO | 2016/111971 A1 | 7/2016 |
| WO | 2020/130749 A1 | 6/2020 |
| WO | 2021/066600 A1 | 4/2021 |

OTHER PUBLICATIONS

Coskun et al., "LY3298176, a novel dual GIP and GLP-1 receptor agonist for the treatment of type 2 diabetes mellitus: From discovery to clinical proof of concept", Molecular Metabolism, vol. 18, Oct. 2018, pp. 3-14.
Samms et al., "How May GIP Enhance the Therapeutic Efficacy of GLP-1?", Trends in Endocrinology & Metabolism, vol. 31. No. 6, Jun. 2020, pp. 410-421.
Extended European Search Report issued Oct. 22, 2024 in Application No. 21880632.1.
Usui, Ryota et al., "Twincretin as a potential therapeutic for the management of type 2 diabetes with obesity", Journal of Diabetes Investigation, Jul. 2019, pp. 902-905, vol. 10, No. 4.
International Search Report for PCT/KR2021/014462, dated Jan. 25, 2022.
Andreas Evers et at., "Multiparameter Peptide Optimization toward Stable Triple Agonists for the Treatment of Diabetes and Obesity", Advanced Therapeutics, Jun. 11, 2020, vol. 3, Issue 9, 2000052, pp. 1-6 (6 pages).
Noura Al-Zamel et al., "A Dual GLP-1/GIP Receptor Agonist Does Not Antagonize Glucagon at Its Receptor but May Act as a Biased Agonist at the GLP-1 Receptor", International Journal of Molecular Sciences, Jul. 19, 2019, vol. 20, No. 3532, pp. 1-11 (11 pages).
Agnés Portron PharmD et al., "Pharmacodynamics, pharmacokinetics, safety and tolerability of the novel dual glucose-dependent insulinotropic polypeptide/glucagon-like peptide-1 agonist RG7697 after single subcutaneous administration in healthy subjects", May 26, 2017, Diabetes Obes Metab, vol. 19, pp. 1446-1453 (9 pages).
Tamer Coskum, et al., "LY3298176, a novel dual GIP and GLP-1 receptor agonist for the treatment of type 2 diabetes mellitus: From discovery to clinical proof of concept", Molecular Metabolism, 2018, vol. 18, pp. 3-14 (12 pages).
Japanese Office Action dated Sep. 16, 2025 in Application No. 2023-522948.

*Primary Examiner* — Amber D Steele
(74) *Attorney, Agent, or Firm* — Sughrue Mion, PLLC

(57) ABSTRACT

Provided is a GLP-1/GIP dual agonist, a pharmaceutically acceptable salt thereof, a solvate thereof, or a long-acting conjugate thereof, or a pharmaceutical composition for preventing or treating diabetes including the same.

24 Claims, 4 Drawing Sheets
Specification includes a Sequence Listing.

(NON-REDUCING CONDITION)

M : PROTEIN SIZE MARKER
1 : IMMUNOGLOBULIN FC
2 : MONO-PEGYLATED DUAL AGONIST OF SEQ ID NO: 20
3 : LONG-ACTING CONJUGATE OF SEQ ID NO: 20
4 : MONO-PEGYLATED DUAL AGONIST OF SEQ ID NO: 36
5 : LONG-ACTING CONJUGATE OF SEQ ID NO: 36
6 : MONO-PEGYLATED DUAL AGONIST OF SEQ ID NO: 40
7 : LONG-ACTING CONJUGATE OF SEQ ID NO: 40

```
                             SEQUENCE LISTING

<160> NUMBER OF SEQ ID NOS: 75

<210> SEQ ID NO 1
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (12)..(16)
<223> OTHER INFORMATION: amino acids at positions 12 and 16 form a ring

<400> SEQUENCE: 1

Tyr Xaa Glu Gly Thr Phe Thr Ser Asp Tyr Ser Glu Tyr Met Glu Lys
1               5                   10                  15

Glu Ala Val Arg Glu Phe Ile Ala Trp Leu Val Lys Gly Gly Pro Ser
            20                  25                  30

Ser Gly Ala Pro Pro Pro Ser Cys
        35                  40

<210> SEQ ID NO 2
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 2

Tyr Xaa Glu Gly Thr Phe Thr Ser Asp Tyr Ser Lys Tyr Leu Asp Glu
1               5                   10                  15
```

-continued

Ile Arg Ala Lys Asp Phe Val Gln Trp Leu Leu Asp His His Pro Ser
            20                  25                  30

Ser Gly Gln Pro Pro Pro Ser Cys
        35                  40

<210> SEQ ID NO 3
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 3

Tyr Xaa Glu Gly Thr Phe Thr Ser Asp Tyr Ser Lys Tyr Leu Asp Glu
1               5                   10                  15

Ile Ala Ala Lys Asp Phe Val Gln Trp Leu Leu Asp His His Pro Ser
            20                  25                  30

Ser Gly Gln Pro Pro Pro Ser Cys
        35                  40

<210> SEQ ID NO 4
<211> LENGTH: 39
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 4

Tyr Xaa Glu Gly Thr Phe Thr Ser Asp Tyr Ser Lys Tyr Leu Asp Glu
1               5                   10                  15

Ile Arg Ala Lys Asp Phe Val Gln Trp Leu Leu Asp His His Pro Ser
            20                  25                  30

Ser Gly Gln Pro Pro Pro Cys
        35

<210> SEQ ID NO 5
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 5

-continued

```
Tyr Xaa Glu Gly Thr Phe Thr Ser Asp Tyr Ser Lys Tyr Leu Asp Glu
1               5                   10                  15

Lys Ala Ala Lys Asp Phe Val Gln Trp Leu Leu Asp His His Pro Ser
            20                  25                  30

Ser Gly Gln Pro Pro Pro Ser Cys
        35                  40

<210> SEQ ID NO 6
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 6

Tyr Xaa Glu Gly Thr Phe Thr Ser Asp Tyr Ser Lys Tyr Leu Asp Glu
1               5                   10                  15

Lys Arg Ala Lys Asp Phe Val Gln Trp Leu Leu Asp His His Pro Ser
            20                  25                  30

Ser Gly Gln Pro Pro Pro Ser Cys
        35                  40

<210> SEQ ID NO 7
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 7

Tyr Xaa Glu Gly Thr Phe Thr Ser Asp Tyr Ser Lys Tyr Leu Asp Glu
1               5                   10                  15

Arg Ala Gln Lys Asp Phe Val Gln Trp Leu Leu Asp His His Pro Ser
            20                  25                  30

Ser Gly Gln Pro Pro Pro Ser Cys
        35                  40

<210> SEQ ID NO 8
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring
```

-continued

<400> SEQUENCE: 8

Tyr Xaa Glu Gly Thr Phe Thr Ser Asp Tyr Ser Lys Tyr Leu Asp Glu
1               5                   10                  15

Arg Ala Ser Lys Asp Phe Val Gln Trp Leu Leu Asp His His Pro Ser
            20                  25                  30

Ser Gly Gln Pro Pro Pro Ser Cys
        35                  40

<210> SEQ ID NO 9
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 9

Tyr Xaa Glu Gly Thr Phe Thr Ser Asp Tyr Ser Arg Tyr Leu Asp Glu
1               5                   10                  15

Arg Ala Ala Lys Asp Phe Val Gln Trp Leu Leu Asp His His Pro Ser
            20                  25                  30

Ser Gly Gln Pro Pro Pro Ser Lys
        35                  40

<210> SEQ ID NO 10
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 10

Tyr Xaa Glu Gly Thr Phe Thr Ser Asp Tyr Ser Arg Tyr Leu Asp Glu
1               5                   10                  15

Arg Ala Gln Lys Asp Phe Val Gln Trp Leu Leu Asp His His Pro Ser
            20                  25                  30

Ser Gly Gln Pro Pro Pro Ser Lys
        35                  40

<210> SEQ ID NO 11
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)

```
<223> OTHER INFORMATION: amino acids at positions 16 and 20 form a ring

<400> SEQUENCE: 11

Tyr Xaa Glu Gly Thr Phe Thr Ser Asp Tyr Ser Arg Tyr Leu Asp Glu
1               5                   10                  15

Arg Ala Ser Lys Asp Phe Val Gln Trp Leu Leu Asp His His Pro Ser
            20                  25                  30

Ser Gly Gln Pro Pro Pro Ser Lys
        35                  40

<210> SEQ ID NO 12
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (12)..(16)
<223> OTHER INFORMATION: amino acids at positions 12 and 16 form a ring

<400> SEQUENCE: 12

Tyr Xaa Glu Gly Thr Phe Thr Ser Asp Tyr Ser Glu Tyr Met Glu Lys
1               5                   10                  15

Glu Ala Val Arg Glu Phe Ile Ala Trp Leu Val Arg Gly Gly Pro Ser
            20                  25                  30

Ser Gly Ala Pro Pro Pro Ser Lys
        35                  40

<210> SEQ ID NO 13
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (12)..(16)
<223> OTHER INFORMATION: amino acids at positions 12 and 16 form a ring

<400> SEQUENCE: 13

Tyr Xaa Glu Gly Thr Phe Thr Ser Asp Tyr Ser Glu Tyr Met Glu Lys
1               5                   10                  15

Glu Ala Val Arg Glu Phe Ile Ser Trp Leu Val Arg Gly Gly Pro Ser
            20                  25                  30

Ser Gly Ala Pro Pro Pro Ser Lys
        35                  40

<210> SEQ ID NO 14
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
```

```
<221> NAME/KEY: MISC_FEATURE
<222> LOCATION: (20)..(20)
<223> OTHER INFORMATION: X is aminoisobutyric acid (Aib)

<400> SEQUENCE: 14

His Xaa Glu Gly Thr Phe Thr Ser Asp Tyr Ser Lys Tyr Leu Asp Lys
1               5                   10                  15

Lys Arg Gln Xaa Glu Phe Val Gln Trp Leu Leu Asn Gly Gly Pro Ser
            20                  25                  30

Ser Gly Ala Pro Pro Pro Ser Cys
        35                  40

<210> SEQ ID NO 15
<211> LENGTH: 41
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 15

Tyr Xaa Glu Gly Thr Phe Thr Ser Asp Tyr Ser Ile Tyr Leu Asp Glu
1               5                   10                  15

Arg Ala Cys Lys Asp Phe Val Gln Trp Leu Leu Asp His His Pro Ser
            20                  25                  30

Ser Gly Gln Pro Pro Pro Ser Tyr Lys
        35                  40

<210> SEQ ID NO 16
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: X is aminoisobutyric acid (Aib)

<400> SEQUENCE: 16

Tyr Xaa Glu Gly Thr Phe Thr Ser Asp Tyr Ser Ile Xaa Leu Asp Lys
1               5                   10                  15

Ile Ala Gln Arg Ala Phe Val Gln Trp Leu Ile Ala Gly Gly Pro Ser
            20                  25                  30

Ser Gly Ala Pro Pro Pro Ser Lys
        35                  40

<210> SEQ ID NO 17
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
```

<223> OTHER INFORMATION: Xaa is aminoisobutyric acid (Aib)

<400> SEQUENCE: 17

Tyr Xaa Glu Gly Thr Phe Thr Ser Asp Tyr Ser Ile Gln Leu Asp Lys
1               5                   10                  15

Ile Ala Gln Lys Ala Phe Val Gln Trp Leu Ile Ala Gly Gly Pro Ser
            20                  25                  30

Ser Gly Ala Pro Pro Pro Ser Cys
        35                  40

<210> SEQ ID NO 18
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)

<400> SEQUENCE: 18

Tyr Xaa Glu Gly Thr Phe Thr Ser Asp Tyr Ser Ile Gln Leu Asp Lys
1               5                   10                  15

Ile Ala Gln Arg Ala Phe Val Gln Trp Leu Ile Ala Gly Gly Pro Ser
            20                  25                  30

Ser Gly Ala Pro Pro Pro Ser Lys
        35                  40

<210> SEQ ID NO 19
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (20)..(20)
<223> OTHER INFORMATION: Xaa is aminoisobutyric acid (Aib)

<400> SEQUENCE: 19

Tyr Xaa Glu Gly Thr Phe Thr Ser Asp Tyr Ser Ile Tyr Leu Asp Lys
1               5                   10                  15

Gln Ala Ala Xaa Ala Phe Val Gln Trp Leu Ile Ala Gly Gly Pro Ser
            20                  25                  30

Ser Gly Ala Pro Pro Pro Ser Cys
        35                  40

<210> SEQ ID NO 20
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)
<220> FEATURE:

```
<221> NAME/KEY: MISC_FEATURE
<222> LOCATION: (20)..(20)
<223> OTHER INFORMATION: Xaa is aminoisobutyric acid (Aib)

<400> SEQUENCE: 20

Tyr Xaa Glu Gly Thr Phe Thr Ser Asp Tyr Ser Ile Xaa Leu Asp Lys
1               5                   10                  15

Gln Ala Ala Xaa Ala Phe Val Gln Trp Leu Ile Ala Gly Gly Pro Ser
            20                  25                  30

Ser Gly Ala Pro Pro Pro Ser Cys
        35                  40

<210> SEQ ID NO 21
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)

<400> SEQUENCE: 21

Tyr Xaa Glu Gly Thr Phe Thr Ser Asp Tyr Ser Ile Xaa Leu Asp Lys
1               5                   10                  15

Ile Ala Ala Lys Ala Phe Val Gln Trp Leu Ile Ala Gly Gly Pro Ser
            20                  25                  30

Ser Gly Ala Pro Pro Pro Ser Cys
        35                  40

<210> SEQ ID NO 22
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 22

Tyr Xaa Glu Gly Thr Phe Thr Ser Asp Tyr Ser Lys Tyr Leu Asp Glu
1               5                   10                  15

Lys Ala Ala Lys Glu Phe Val Gln Trp Leu Leu Asp Gln His Pro Ser
            20                  25                  30

Ser Gly Gln Pro Pro Pro Ser Cys
        35                  40

<210> SEQ ID NO 23
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
```

<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 23

Tyr Xaa Glu Gly Thr Phe Thr Ser Asp Tyr Ser Lys Tyr Leu Asp Glu
1               5                   10                  15

Gln Ala Ala Lys Glu Phe Val Gln Trp Leu Leu Asp Gln His Pro Ser
            20                  25                  30

Ser Gly Ala Pro Pro Pro Ser Cys
        35                  40

<210> SEQ ID NO 24
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 24

Tyr Xaa Glu Gly Thr Phe Thr Ser Asp Tyr Ser Lys Tyr Leu Asp Glu
1               5                   10                  15

Ile Ala Gln Lys Asp Phe Val Gln Trp Leu Leu Asp Gln His Pro Ser
            20                  25                  30

Ser Gly Ala Pro Pro Pro Ser Cys
        35                  40

<210> SEQ ID NO 25
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(20)
<223> OTHER INFORMATION: amino acids at positions 16 and 20 form a ring

<400> SEQUENCE: 25

Tyr Xaa Glu Gly Thr Phe Thr Ser Asp Tyr Ser Lys Tyr Leu Asp Glu
1               5                   10                  15

Glu Ala Val Lys Leu Phe Val Gln Trp Leu Leu Asp Gln His Pro Ser
            20                  25                  30

Ser Gly Ala Pro Pro Pro Ser Cys
        35                  40

<210> SEQ ID NO 26
<211> LENGTH: 43
<212> TYPE: PRT
<213> ORGANISM: Artificial
<220> FEATURE:
<223> OTHER INFORMATION: GLP-1/GIP dual agonist
<220> FEATURE:

<221> NAME/KEY: MISC_FEATURE
<222> LOCATION: (2)..(2)
<223> OTHER INFORMATION: Xaa is aminoisobutyric acid (Aib)

<400> SEQUENCE: 26

Tyr Xaa Glu Gly Thr Phe Thr Ser Asp Tyr Ser Ile Ala Met Asp Ala
1               5                   10                  15

Ile Ala Gln Gln Asp Phe Val Asn Trp Leu Leu Ala Gln Lys Gly Lys
            20                  25                  30

Lys Asn Asp Trp Lys His Asn Ile Thr Gln Cys
        35                  40

<210> SEQ ID NO 27
<211> LENGTH: 43
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)

<400> SEQUENCE: 27

Tyr Xaa Glu Gly Thr Phe Thr Ser Asp Tyr Ser Ile Ala Met Asp Ala
1               5                   10                  15

Ile Ala Gln Gln Asp Phe Val Asn Trp Leu Leu Ala Gln Arg Gly Lys
            20                  25                  30

Lys Ser Asp Trp Lys His Asn Ile Thr Gln Cys
        35                  40

<210> SEQ ID NO 28
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)

<400> SEQUENCE: 28

Tyr Xaa Glu Gly Thr Phe Thr Ser Asp Tyr Ser Ile Ala Leu Glu Lys
1               5                   10                  15

Gln Ala Gln Gln Asp Phe Val Asn Trp Leu Leu Ala Gly Gly Pro Ser
            20                  25                  30

Ser Gly Ala Pro Pro Pro Ser Cys
        35                  40

<210> SEQ ID NO 29
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)
<220> FEATURE:
<221> NAME/KEY: MISC_FEATURE
<222> LOCATION: (20)..(20)

<223> OTHER INFORMATION: Xaa is aminoisobutyric acid (Aib)
<220> FEATURE:
<221> NAME/KEY: MISC_FEATURE
<222> LOCATION: (28)..(28)
<223> OTHER INFORMATION: Xaa is aminoisobutyric acid (Aib)

<400> SEQUENCE: 29

Tyr Xaa Glu Gly Thr Phe Thr Ser Asp Tyr Ser Ile Xaa Leu Asp Lys
1               5                   10                  15

Gln Ala Ala Xaa Glu Phe Val Asn Trp Leu Leu Xaa Gly Gly Pro Ser
            20                  25                  30

Ser Gly Ala Pro Pro Pro Ser Cys
        35                  40

<210> SEQ ID NO 30
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)
<220> FEATURE:
<221> NAME/KEY: MISC_FEATURE
<222> LOCATION: (20)..(20)
<223> OTHER INFORMATION: Xaa is aminoisobutyric acid (Aib)
<220> FEATURE:
<221> NAME/KEY: MISC_FEATURE
<222> LOCATION: (28)..(28)
<223> OTHER INFORMATION: Xaa is aminoisobutyric acid (Aib)

<400> SEQUENCE: 30

Tyr Xaa Glu Gly Thr Phe Thr Ser Asp Tyr Ser Ile Xaa Leu Asp Lys
1               5                   10                  15

Gln Ala Ala Xaa Glu Phe Val Asn Trp Leu Leu Xaa Gly His Pro Ser
            20                  25                  30

Ser Gly Ala Pro Pro Pro Ser Cys
        35                  40

<210> SEQ ID NO 31
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (1)..(1)
<223> OTHER INFORMATION: Xaa is 3-(4-hydroxyphenyl)propanoic acid (HP)
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)

<400> SEQUENCE: 31

Xaa Xaa Glu Gly Thr Phe Thr Ser Asp Tyr Ser Ile Xaa Leu Asp Lys
1               5                   10                  15

Ile Ala Gln Arg Ala Phe Val Gln Trp Leu Ile Ala Gly Gly Pro Ser
            20                  25                  30

Ser Gly Ala Pro Pro Pro Ser Lys
        35                  40

<210> SEQ ID NO 32
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (1)..(1)
<223> OTHER INFORMATION: Xaa is 2-(4-hydroxyphenyl)acetic acid (HA)
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)

<400> SEQUENCE: 32

Xaa Xaa Glu Gly Thr Phe Thr Ser Asp Tyr Ser Ile Xaa Leu Asp Lys
1               5                   10                  15

Ile Ala Gln Arg Ala Phe Val Gln Trp Leu Ile Ala Gly Gly Pro Ser
            20                  25                  30

Ser Gly Ala Pro Pro Pro Ser Lys
        35                  40

<210> SEQ ID NO 33
<211> LENGTH: 41
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (1)..(1)
<223> OTHER INFORMATION: Xaa is 4-imidazoleacetic acid (CA)
<220> FEATURE:
<221> NAME/KEY: MISC_FEATURE
<222> LOCATION: (3)..(3)
<223> OTHER INFORMATION: Xaa is aminoisobutyric acid (Aib)
<220> FEATURE:
<221> NAME/KEY: MISC_FEATURE
<222> LOCATION: (14)..(14)
<223> OTHER INFORMATION: Xaa is aminoisobutyric acid (Aib)

<400> SEQUENCE: 33

Xaa Tyr Xaa Glu Gly Thr Phe Thr Ser Asp Tyr Ser Ile Xaa Leu Asp
1               5                   10                  15

Lys Ile Ala Gln Arg Ala Phe Val Gln Trp Leu Ile Ala Gly Gly Pro
            20                  25                  30

Ser Ser Gly Ala Pro Pro Pro Ser Lys
        35                  40

<210> SEQ ID NO 34
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)

<400> SEQUENCE: 34

Tyr Xaa Glu Gly Thr Phe Thr Ser Asp Tyr Ser Ile Xaa Leu Asp Lys
1               5                   10                  15

Gln Ala Ala Arg Ala Phe Val Gln Trp Leu Ile Ala Gly Gly Pro Ser
            20                  25                  30

Ser Gly Ala Pro Pro Pro Ser Cys
        35                  40

<210> SEQ ID NO 35
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)
<220> FEATURE:
<221> NAME/KEY: MISC_FEATURE
<222> LOCATION: (20)..(20)
<223> OTHER INFORMATION: Xaa is aminoisobutyric acid (Aib)

<400> SEQUENCE: 35

Tyr Xaa Glu Gly Thr Phe Thr Ser Asp Tyr Ser Ile Xaa Leu Asp Lys
1               5                   10                  15

Gln His Ala Xaa Ala Phe Val Gln Trp Leu Ile Ala Gly Gly Pro Ser
            20                  25                  30

Ser Gly Ala Pro Pro Pro Ser Cys
        35                  40

<210> SEQ ID NO 36
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)

<400> SEQUENCE: 36

Tyr Xaa Glu Gly Thr Phe Thr Ser Asp Tyr Ser Ile Xaa Leu Asp Lys
1               5                   10                  15

Gln Ala Gln Gln Ala Phe Val Gln Trp Leu Ile Ala Gly Gly Pro Ser
            20                  25                  30

Ser Gly Ala Pro Pro Pro Ser Cys
        35                  40

<210> SEQ ID NO 37
<211> LENGTH: 40
<212> TYPE: PRT
<213> ORGANISM: Artificial
<220> FEATURE:
<223> OTHER INFORMATION: GLP-1/GIP dual agonist

```
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)
<220> FEATURE:
<221> NAME/KEY: MISC_FEATURE
<222> LOCATION: (20)..(20)
<223> OTHER INFORMATION: Xaa is aminoisobutyric acid (Aib)
<220> FEATURE:
<221> NAME/KEY: misc_feature
<222> LOCATION: (21)..(21)
<223> OTHER INFORMATION: Xaa can be any naturally occurring amino acid

<400> SEQUENCE: 37

Tyr Xaa Glu Gly Thr Phe Thr Ser Asp Tyr Ser Ile Xaa Leu Asp Lys
 1               5                  10                  15

Gln Ala Gln Gln Xaa Phe Val Gln Trp Leu Ile Ala Gly Gly Pro Ser
            20                  25                  30

Ser Gly Ala Pro Pro Pro Ser Cys
        35                  40

<210> SEQ ID NO 38
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)

<400> SEQUENCE: 38

Tyr Xaa Glu Gly Thr Phe Thr Ser Asp Tyr Ser Ile Xaa Leu Glu Lys
 1               5                  10                  15

Gln Ala Gln Gln Asp Phe Val Asn Trp Leu Leu Ala Gly Gly Pro Ser
            20                  25                  30

Ser Gly Ala Pro Pro Pro Ser Cys
        35                  40

<210> SEQ ID NO 39
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (20)..(20)
<223> OTHER INFORMATION: Xaa is aminoisobutyric acid (Aib)

<400> SEQUENCE: 39

Tyr Xaa Glu Gly Thr Phe Thr Ser Asp Tyr Ser Ile Ala Leu Glu Lys
 1               5                  10                  15

Gln Ala Ala Xaa Asp Phe Val Asn Trp Leu Leu Ala Gly Gly Pro Ser
            20                  25                  30
```

Ser Gly Ala Pro Pro Pro Ser Cys
        35                  40

<210> SEQ ID NO 40
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (2)..(2)
<223> OTHER INFORMATION: Xaa is aminoisobutyric acid (Aib)

<400> SEQUENCE: 40

Tyr Xaa Glu Gly Thr Phe Thr Ser Asp Tyr Ser Ile Ala Leu Glu Lys
1               5                   10                  15

Gln Ala Gln Arg Asp Phe Val Asn Trp Leu Leu Ala Gly Gly Pro Ser
            20                  25                  30

Ser Gly Ala Pro Pro Pro Ser Cys
        35                  40

<210> SEQ ID NO 41
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (1)..(1)
<223> OTHER INFORMATION: Xaa is 3-(4-hydroxyphenyl)propanoic acid (HP)
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)
<223> OTHER INFORMATION: Xaa is aminoisobutyric acid (Aib)
<220> FEATURE:
<221> NAME/KEY: MISC_FEATURE
<222> LOCATION: (20)..(20)
<223> OTHER INFORMATION: Xaa is aminoisobutyric acid (Aib)

<400> SEQUENCE: 41

Xaa Xaa Glu Gly Thr Phe Thr Ser Asp Tyr Ser Ile Xaa Leu Asp Ala
1               5                   10                  15

Gln Ala Ala Xaa Ala Phe Val Gln Trp Leu Ile Ala Gly Gly Pro Ser
            20                  25                  30

Ser Gly Ala Pro Pro Pro Ser Lys
        35                  40

<210> SEQ ID NO 42
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (1)..(1)
<223> OTHER INFORMATION: Xaa is 3-(4-hydroxyphenyl)propanoic acid (HP)
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (13)..(13)

```
<223> OTHER INFORMATION: Xaa is aminoisobutyric acid (Aib)
<220> FEATURE:
<221> NAME/KEY: MISC_FEATURE
<222> LOCATION: (16)..(16)
<223> OTHER INFORMATION: Xaa is Norleucine (Nle)
<220> FEATURE:
<221> NAME/KEY: MISC_FEATURE
<222> LOCATION: (20)..(20)
<223> OTHER INFORMATION: Xaa is aminoisobutyric acid (Aib)

<400> SEQUENCE: 42

Xaa Xaa Glu Gly Thr Phe Thr Ser Asp Tyr Ser Ile Xaa Leu Asp Xaa
1               5                   10                  15

Gln Ala Ala Xaa Ala Phe Val Gln Trp Leu Ile Ala Gly Gly Pro Ser
            20                  25                  30

Ser Gly Ala Pro Pro Pro Ser Lys
        35                  40

<210> SEQ ID NO 43
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (1)..(1)
<223> OTHER INFORMATION: Xaa is 3-(4-hydroxyphenyl)propanoic acid (HP)
<220> FEATURE:
<221> NAME/KEY: MISC_FEATURE
<222> LOCATION: (2)..(2)
<223> OTHER INFORMATION: Xaa is aminoisobutyric acid (Aib)

<400> SEQUENCE: 43

Xaa Xaa Glu Gly Thr Phe Ile Ser Asp Tyr Ser Ile Ala Leu Glu Ala
1               5                   10                  15

Gln Ala Gln Gln Asp Phe Val Asn Trp Leu Leu Ala Gly Gly Pro Ser
            20                  25                  30

Ser Gly Ala Pro Pro Pro Ser Lys
        35                  40

<210> SEQ ID NO 44
<211> LENGTH: 40
<212> TYPE: PRT
<213> ORGANISM: Artificial
<220> FEATURE:
<223> OTHER INFORMATION: GLP-1/GIP dual agonist
<220> FEATURE:
<221> NAME/KEY: MISC_FEATURE
<222> LOCATION: (1)..(1)
<223> OTHER INFORMATION: Xaa is 3-(4-hydroxyphenyl)propanoic acid (HP)
<220> FEATURE:
<221> NAME/KEY: MISC_FEATURE
<222> LOCATION: (2)..(2)
<223> OTHER INFORMATION: Xaa is aminoisobutyric acid (Aib)
<220> FEATURE:
<221> NAME/KEY: MISC_FEATURE
<222> LOCATION: (16)..(16)
<223> OTHER INFORMATION: Xaa is Norleucine (Nle)

<400> SEQUENCE: 44

Xaa Xaa Glu Gly Thr Phe Ile Ser Asp Tyr Ser Ile Ala Leu Glu Xaa
1               5                   10                  15

Gln Ala Gln Gln Asp Phe Val Asn Trp Leu Leu Ala Gly Gly Pro Ser
            20                  25                  30

Ser Gly Ala Pro Pro Pro Ser Lys
        35                  40
```

```
<210> SEQ ID NO 45
<211> LENGTH: 12
<212> TYPE: PRT
<213> ORGANISM: Homo sapiens

<400> SEQUENCE: 45

Glu Ser Lys Tyr Gly Pro Pro Cys Pro Ser Cys Pro
1               5                   10

<210> SEQ ID NO 46
<211> LENGTH: 11
<212> TYPE: PRT
<213> ORGANISM: Artificial
<220> FEATURE:
<223> OTHER INFORMATION: Variant of hinge region

<400> SEQUENCE: 46

Glu Ser Lys Tyr Gly Pro Pro Pro Ser Cys Pro
1               5                   10

<210> SEQ ID NO 47
<211> LENGTH: 11
<212> TYPE: PRT
<213> ORGANISM: Artificial
<220> FEATURE:
<223> OTHER INFORMATION: Variant of hinge region

<400> SEQUENCE: 47

Glu Ser Lys Tyr Gly Pro Pro Cys Pro Ser Pro
1               5                   10

<210> SEQ ID NO 48
<211> LENGTH: 10
<212> TYPE: PRT
<213> ORGANISM: Artificial
<220> FEATURE:
<223> OTHER INFORMATION: Variant of hinge region

<400> SEQUENCE: 48

Glu Ser Lys Tyr Gly Pro Pro Cys Pro Ser
1               5                   10

<210> SEQ ID NO 49
<211> LENGTH: 10
<212> TYPE: PRT
<213> ORGANISM: Artificial
<220> FEATURE:
<223> OTHER INFORMATION: Variant of hinge region

<400> SEQUENCE: 49

Glu Ser Lys Tyr Gly Pro Pro Cys Pro Pro
1               5                   10

<210> SEQ ID NO 50
<211> LENGTH: 8
<212> TYPE: PRT
<213> ORGANISM: Artificial
<220> FEATURE:
<223> OTHER INFORMATION: Variant of hinge region

<400> SEQUENCE: 50

Lys Tyr Gly Pro Pro Cys Pro Ser
1               5

<210> SEQ ID NO 51
<211> LENGTH: 8
```

```
<212> TYPE: PRT
<213> ORGANISM: Artificial
<220> FEATURE:
<223> OTHER INFORMATION: Variant of hinge region

<400> SEQUENCE: 51

Glu Ser Lys Tyr Gly Pro Pro Cys
1               5

<210> SEQ ID NO 52
<211> LENGTH: 7
<212> TYPE: PRT
<213> ORGANISM: Artificial
<220> FEATURE:
<223> OTHER INFORMATION: Variant of hinge region

<400> SEQUENCE: 52

Glu Lys Tyr Gly Pro Pro Cys
1               5

<210> SEQ ID NO 53
<211> LENGTH: 6
<212> TYPE: PRT
<213> ORGANISM: Artificial
<220> FEATURE:
<223> OTHER INFORMATION: Variant of hinge region

<400> SEQUENCE: 53

Glu Ser Pro Ser Cys Pro
1               5

<210> SEQ ID NO 54
<211> LENGTH: 5
<212> TYPE: PRT
<213> ORGANISM: Artificial
<220> FEATURE:
<223> OTHER INFORMATION: Variant of hinge region

<400> SEQUENCE: 54

Glu Pro Ser Cys Pro
1               5

<210> SEQ ID NO 55
<211> LENGTH: 4
<212> TYPE: PRT
<213> ORGANISM: Artificial
<220> FEATURE:
<223> OTHER INFORMATION: Variant of hinge region

<400> SEQUENCE: 55

Pro Ser Cys Pro
1

<210> SEQ ID NO 56
<211> LENGTH: 10
<212> TYPE: PRT
<213> ORGANISM: Artificial
<220> FEATURE:
<223> OTHER INFORMATION: Variant of hinge region

<400> SEQUENCE: 56

Glu Ser Lys Tyr Gly Pro Pro Ser Cys Pro
1               5                   10

<210> SEQ ID NO 57
<211> LENGTH: 9
<212> TYPE: PRT
```

```
<213> ORGANISM: Artificial
<220> FEATURE:
<223> OTHER INFORMATION: Variant of hinge region

<400> SEQUENCE: 57

Lys Tyr Gly Pro Pro Ser Cys Pro
1               5

<210> SEQ ID NO 58
<211> LENGTH: 9
<212> TYPE: PRT
<213> ORGANISM: Artificial
<220> FEATURE:
<223> OTHER INFORMATION: Variant of hinge region

<400> SEQUENCE: 58

Glu Ser Lys Tyr Gly Pro Ser Cys Pro
1               5

<210> SEQ ID NO 59
<211> LENGTH: 8
<212> TYPE: PRT
<213> ORGANISM: Artificial
<220> FEATURE:
<223> OTHER INFORMATION: Variant of hinge region

<400> SEQUENCE: 59

Glu Ser Lys Tyr Gly Pro Pro Cys
1               5

<210> SEQ ID NO 60
<211> LENGTH: 7
<212> TYPE: PRT
<213> ORGANISM: Artificial
<220> FEATURE:
<223> OTHER INFORMATION: Variant of hinge region

<400> SEQUENCE: 60

Lys Tyr Gly Pro Pro Cys Pro
1               5

<210> SEQ ID NO 61
<211> LENGTH: 7
<212> TYPE: PRT
<213> ORGANISM: Artificial
<220> FEATURE:
<223> OTHER INFORMATION: Variant of hinge region

<400> SEQUENCE: 61

Glu Ser Lys Pro Ser Cys Pro
1               5

<210> SEQ ID NO 62
<211> LENGTH: 6
<212> TYPE: PRT
<213> ORGANISM: Artificial
<220> FEATURE:
<223> OTHER INFORMATION: Variant of hinge region

<400> SEQUENCE: 62

Glu Ser Pro Ser Cys Pro
1               5

<210> SEQ ID NO 63
<211> LENGTH: 4
<212> TYPE: PRT
<213> ORGANISM: Artificial
```

```
<220> FEATURE:
<223> OTHER INFORMATION: Variant of hinge region

<400> SEQUENCE: 63

Glu Pro Ser Cys
1

<210> SEQ ID NO 64
<211> LENGTH: 3
<212> TYPE: PRT
<213> ORGANISM: Artificial
<220> FEATURE:
<223> OTHER INFORMATION: Variant of hinge region

<400> SEQUENCE: 64

Ser Cys Pro
1

<210> SEQ ID NO 65
<211> LENGTH: 5
<212> TYPE: PRT
<213> ORGANISM: Artificial
<220> FEATURE:
<223> OTHER INFORMATION: Synthetic construct (linker)

<400> SEQUENCE: 65

Gly Gly Gly Gly Ser
1               5

<210> SEQ ID NO 66
<211> LENGTH: 5
<212> TYPE: PRT
<213> ORGANISM: Artificial
<220> FEATURE:
<223> OTHER INFORMATION: Synthetic construct (linker)

<400> SEQUENCE: 66

Ser Gly Gly Gly Gly
1               5

<210> SEQ ID NO 67
<211> LENGTH: 5
<212> TYPE: PRT
<213> ORGANISM: Artificial
<220> FEATURE:
<223> OTHER INFORMATION: Synthetic construct (linker)

<400> SEQUENCE: 67

Ser Arg Ser Ser Gly
1               5

<210> SEQ ID NO 68
<211> LENGTH: 5
<212> TYPE: PRT
<213> ORGANISM: Artificial
<220> FEATURE:
<223> OTHER INFORMATION: Synthetic construct (linker)

<400> SEQUENCE: 68

Ser Gly Ser Ser Cys
1               5

<210> SEQ ID NO 69
<211> LENGTH: 12
<212> TYPE: PRT
<213> ORGANISM: Artificial
<220> FEATURE:
```

<223> OTHER INFORMATION: Synthetic construct (linker)

<400> SEQUENCE: 69

Gly Lys Ser Ser Gly Ser Gly Ser Glu Ser Lys Ser
1               5                   10

<210> SEQ ID NO 70
<211> LENGTH: 6
<212> TYPE: PRT
<213> ORGANISM: Artificial
<220> FEATURE:
<223> OTHER INFORMATION: Synthetic construct (linker)

<400> SEQUENCE: 70

Arg Pro Pro Pro Pro Cys
1               5

<210> SEQ ID NO 71
<211> LENGTH: 7
<212> TYPE: PRT
<213> ORGANISM: Artificial
<220> FEATURE:
<223> OTHER INFORMATION: Synthetic construct (linker)

<400> SEQUENCE: 71

Ser Ser Pro Pro Pro Pro Cys
1               5

<210> SEQ ID NO 72
<211> LENGTH: 14
<212> TYPE: PRT
<213> ORGANISM: Artificial
<220> FEATURE:
<223> OTHER INFORMATION: Synthetic construct (linker)

<400> SEQUENCE: 72

Gly Ser Thr Ser Gly Ser Gly Lys Ser Ser Glu Gly Lys Gly
1               5                   10

<210> SEQ ID NO 73
<211> LENGTH: 18
<212> TYPE: PRT
<213> ORGANISM: Artificial
<220> FEATURE:
<223> OTHER INFORMATION: Synthetic construct (linker)

<400> SEQUENCE: 73

Gly Ser Thr Ser Gly Ser Gly Lys Ser Ser Glu Gly Ser Gly Ser Thr
1               5                   10                  15

Lys Gly

<210> SEQ ID NO 74
<211> LENGTH: 18
<212> TYPE: PRT
<213> ORGANISM: Artificial
<220> FEATURE:
<223> OTHER INFORMATION: Synthetic construct (linker)

<400> SEQUENCE: 74

Gly Ser Thr Ser Gly Ser Gly Lys Pro Gly Ser Gly Glu Gly Ser Thr
1               5                   10                  15

Lys Gly

<210> SEQ ID NO 75
<211> LENGTH: 14

```
<212> TYPE: PRT
<213> ORGANISM: Artificial
<220> FEATURE:
<223> OTHER INFORMATION: Synthetic construct (linker)

<400> SEQUENCE: 75

Glu Gly Lys Ser Ser Gly Ser Gly Ser Glu Ser Lys Glu Phe
1               5                   10
```

GLP-1/GIP DUAL AGONIST, LONG-ACTING CONJUGATE THEREOF, AND PHARMACEUTICAL COMPOSITION COMPRISING SAME

CROSS REFERENCE TO RELATED APPLICATIONS

This application is a National Stage of International Application No. PCT/KR2021/014462 filed Oct. 18, 2021, claiming priority based on Korean Patent Application No. 10-2020-0134478 filed Oct. 16, 2020.

INCORPORATION BY REFERENCE OF SEQUENCE LISTING

The content of the electronically submitted sequence listing, file name: Q286821_Sequence_Listing_As_Filed.txt; size: 35,339 bytes; and date of creation: Apr. 13, 2023, filed herewith, is incorporated herein by reference in its entirety.

TECHNICAL FIELD

The present disclosure relates to a GLP-1/GIP dual agonist, a long-acting conjugate thereof, and a pharmaceutical composition for preventing or treating diabetes including the same.

BACKGROUND ART

Glucagon-like peptide-1 (GLP-1) is an incretin hormone secreted from the small intestine in response to food intake. GLP-1 promotes the secretion of insulin from the pancreas in a blood glucose concentration-dependent manner and suppresses the secretion of glucagon to help lower blood glucose levels. In addition, GLP-1 acts as a satiety factor to slow down the digestive process of the stomach and delays the gastric transit time of digested food, thereby reducing food intake. Moreover, when administered to rats, GLP-1 exhibits the effects of suppressing food intake and reducing body weight, and these effects appear equally in both normal and obese states, showing the potential as a treatment for obesity.

Glucose-dependent insulinotropic polypeptide (GIP) is one of the representative incretin hormones secreted in the gastrointestinal tract and is a neurohormone. Like GLP-1, GIP is secreted in response to food intake. GIP is a hormone consisting of 42 amino acids secreted from K cells of the small intestine. GIP not only maintains blood glucose homeostasis by regulating the secretion of insulin or glucagon in the pancreas in a blood glucose concentration-dependent manner, but also, like GLP-1, functions as a dietary suppressant through the central nervous system and vagus nerve.

GLP-1 has been prescribed to diabetic and obese patients for more than 10 years as a treatment for diabetes and obesity due to the effect of lowering blood glucose through blood glucose-dependent insulin secretion and weight loss through dietary suppression, and its use in the development of several improved drugs with better efficacy and increased durability is also actively progressing. However, with GLP-1 drugs alone, the expected reduction of glycated hemoglobin (HbA1c) does not exceed 2%, and diabetic patients whose HbA1c exceeds 9% may need to use insulin-based drugs in combination. In fact, combinations of GLP-1 and insulin have been approved and used. However, as long as they use insulin, they are not free from the risk of hypoglycemia. For this reason, GIP, which can control blood glucose and has no risk of hypoglycemia, is emerging as a new partner for GLP-1 drugs.

When a dual agonist capable of simultaneously activating GLP-1 and GIP receptors is developed, blood glucose and weight control effects that are superior to those of each alone can be expected without concerns about hypoglycemia. Accordingly, it is expected that a novel substance capable of highly activating GLP-1 and GIP receptors can be used as a next-generation therapeutic agent for diabetes and obesity that can replace GLP-1 drugs.

DISCLOSURE

Technical Problem

Provided is a novel GLP-1/GIP dual agonist.

Provided is a polynucleotide encoding the GLP-1/GIP dual agonist.

Provided is a vector containing the polynucleotide.

Provided is a host cell containing the polynucleotide or the vector.

Provided is a conjugate in which the GLP-1/GIP dual agonist is combined with a biocompatible material increasing in vivo half-life.

Provided is a pharmaceutical composition for preventing or treating diabetes including the GLP-1/GIP dual agonist, a pharmaceutically acceptable salt thereof, a solvate thereof, or the conjugate thereof.

Provided is a method of preventing or treating diabetes, including administering an effective amount of the GLP-1/GIP dual agonist, a pharmaceutically acceptable salt thereof, a solvate thereof, or the conjugate thereof, or the pharmaceutical composition to a subject in need thereof.

Provided is use of the GLP-1/GIP dual agonist, a pharmaceutically acceptable salt thereof, the solvate thereof, or the conjugate thereof for use in preparing a drug for preventing or treating diabetes.

Technical Solution

Throughout this specification, for naturally occurring amino acids, the usual one-letter and three-letter codes are used, and for other amino acids such as Aib (α-aminoisobutyric acid), Nle (norleucine, 2-am inohexanoic acid), etc, a generally accepted three-letter code is used. Amino acids which are referred to by abbreviations herein are described according to the IUPAC-IUB nomenclature.

Alanine Ala, A Arginine Arg, R
Asparagine Asn, N Aspartate Asp, D
Cysteine Cys, C Glutamic acid Glu, E
Glutamine Gln, Q Glycine Gly, G
Histidine His, H Isoleucine Ile, I
Leucine Leu, L Lysine Lys, K
Methionine Met, M Phenylalanine Phe, F
Proline Pro, P Serine Ser, S
Threonine Thr, T Tryptophan Trp, W
Tyrosine Tyr, Y Valine Val, V One aspect provides a GLP-1/GIP dual agonist.

The term "Glucagon-like peptide-1 (GLP-1)" used herein is a hormone secreted by L cells in the small intestine in response to food intake. GLP-1 promotes the secretion of insulin from the pancreas in a blood glucose concentration-dependent manner and suppresses the secretion of glucagon to help lower the blood glucose concentration.

The term "Glucose-dependent insulinotropic polypeptide or gastric inhibitory polypeptide (GIP)" used herein is a hormone secreted from K cells in the small intestine when stimulated by food intake, and was first reported as a substance involved in regulating blood glucose concentration.

The "GLP-1/GIP dual agonist" is interchangeable with "GLP-1/GIP receptor dual agonist", "GLP-1 receptor and GIP receptor dual agonist", "GLP-1R/GIPR dual agonist", "dual agonists", or "peptides that are active against the GLP-1 receptor and the GIP receptor".

The GLP-1/GIP dual agonist may be a peptide having an activity against at least one of the GLP-1 receptor and the GIP receptor. In an embodiment, the GLP-1/GIP dual agonist may be a peptide having an activity against the GLP-1 receptor and the GIP receptor. The "peptide having activity against the GLP-1 receptor and GIP receptor" has a significant level of activity against the GLP-1 receptor and the GIP receptor. For example, the in vitro activity thereof on each of the GLP-1 receptor and the GIP receptor may be about 0.1% or more, about 1% or more, about 2% or more, about 3% or more, about 4% or more, about 5% or more, about 6% or more, about 7% or more, about 8% or more, about 9% or more, about 10% or more, about 20% or more, about 30% or more, about 40% or more, about 50% or more, about 60% or more, about 70% or more, about 80% or more, about 90% or more, about 100% or more, from about 100% to about 500%, or from about 100% to from about 200%, compared to the native-type ligand (native-type GLP-1 or native-type GIP). For a method for measuring the in vitro activity of peptides having activity against the GLP-1 receptor and GIP receptor, Example 2 of the present specification may be referred to. However, the method is not limited thereto, and any method that is known in the art, may be appropriately used.

The GLP-1/GIP dual agonist may exhibit balanced GLP-1 and GIP activities. The balanced activity against GLP-1 and GIP refers to a case where, when measured using an in vitro binding assay, the affinity of a peptide for the GLP-1 receptor and GIP receptor is close to a molar ratio of 1:1, for example, a molar ratio of 1:100 to 100:1, or a molar ratio of 1:10 to 10:1, or a molar ratio of 1:2 to 2:1.

"About" is a range that includes all of ±0.5, ±0.4, ±0.3, ±0.2, ±0.1, etc., and includes all ranges equal to or similar to the numerical value following the term "about." However, the definition of "about" is not limited thereto.

In an embodiment, the GLP-1/GIP dual agonist refers to a native-type or unmutated protein (for example, GLP-1 or GIP) in which 1, 2, 3, 4, 5, 6, 7, 8, 9, 10 or more amino acids are subjected to conservative substitutions, but is not limited thereto.

"Conservative substitution" refers to the substitution of one amino acid with another amino acid having similar structural and/or chemical properties. The dual agonist may have, for example, one or more conservative substitutions while still retaining the biological activity of the native-type or unmutated GLP-1 or GIP protein. Such amino acid substitutions may generally occur based on similarities in polarity, charge, solubility, hydrophobicity, hydrophilicity, and/or amphipathic nature of the residues. For example, positively charged (basic) amino acids include arginine, lysine, and histidine; negatively charged (acidic) amino acids include glutamic acid and aspartic acid; aromatic amino acids include phenylalanine, tryptophan and tyrosine; hydrophobic amino acids include alanine, valine, isoleucine, leucine, methionine, phenylalanine, tyrosine and tryptophan. In addition, amino acids can be classified into amino acids with electrically charged side chains and amino acids with uncharged side chains. Amino acids with charged side chains include aspartic acid, glutamic acid, lysine, arginine, and histidine, and amino acids with uncharged side chains can be further classified as nonpolar amino acids or polar amino acids. The nonpolar amino acids may include glycine, alanine, valine, leucine, isoleucine, methionine, proline; and polar amino acids may include serine, threonine, cysteine, asparagine, and glutamine. Conservative substitutions with amino acids having similar properties as described above may be expected to exhibit the same or similar activity.

The GLP-1/GIP dual agonist may be non-naturally occurring.

The GLP-1/GIP dual agonist may be an isolated peptide.

In an embodiment, the GLP-1/GIP dual agonist may be a peptide including an amino acid sequence represented by General Formula 1:

R1-Xaa1-Aib (aminoisobutyric acid)-Glu-Gly-Thr-

Phe-Xaa7-Ser-Asp-Tyr-Ser-Xaa12-Xaa13-Xaa14-Xaa15-

Xaa16-Xaa17-Xaa18-Xaa19-Xaa20-Xaa21-Phe-Xaa23-

Xaa24-Trp-Leu-Xaa27-Xaa28-Xaa29-Xaa30-Xaa31-Xaa32-

Xaa33-Xaa34-Xaa35-Xaa36-Xaa37-Xaa38-Xaa39-Xaa40-

Xaa41-Xaa42-Xaa43 (General Formula 1).

In General Formula 1,

R1 may be 4-imidazoleacetic acid (CA) or is absent,

Xaa1 is tyrosine (Tyr, Y), histidine (His, H), 3-(4-hydroxyphenyl)propanoic acid (HP), or 2-(4-hydroxyphenyl)acetic acid (HA), Xaa7 is threonine (Thr, T) or isoleucine (Ile, I);

Xaa12 is glutamic acid (Glu, E), isoleucine (Ile, I), lysine (Lys, K), or arginine (Arg, R);

Xaa13 is alanine (Ala, A), Aib, tyrosine (Tyr, Y), or glutamine (Gln, Q);

Xaa14 is methionine (Met, M) or leucine (Leu, L);

Xaa15 is aspartic acid (Asp, D) or glutamic acid (Glu, E);

Xaa16 is lysine (Lys, K), glutamic acid (Glu, E), alanine (Ala, A), or norleucine (Nle);

Xaa17 is glutamic acid (Glu, E), isoleucine (Ile, I), lysine (Lys, K), arginine (Arg, R), or glutamine (Gln, Q);

Xaa18 is alanine (Ala, A), arginine (Arg, R), or histidine (His, H);

Xaa19 is valine (Val, V), alanine (Ala, A), glutamine (Gln, Q), serine (Ser, S), or cysteine (Cys, C);

Xaa20 is arginine (Arg, R), lysine (Lys, K), Aib, or glutamine (Gln, Q);

Xaa21 is glutamic acid (Glu, E), aspartic acid (Asp, D), alanine (Ala, A), leucine (Leu, L), or Aib;

Xaa23 is isoleucine (Ile, I) or valine (Val, V);

Xaa24 is alanine (Ala, A), glutamine (Gln, Q), serine (Ser, S), or asparagine (Asn, N);

Xaa27 is valine (Val, V), leucine (Leu, L), or isoleucine (Ile, I);

Xaa28 is lysine (Lys, K), aspartic acid (Asp, D), arginine (Arg, R), asparagine (Asn, N), alanine (Ala, A), or Aib;

Xaa29 is glycine (Gly, G), histidine (His, H), or glutamine (Gln, Q);

Xaa30 is glycine (Gly, G), histidine (His, H), lysine (Lys, K), or arginine (Arg, R);

Xaa31 is proline (Pro, P) or glycine (Gly, G);

Xaa32 is serine (Ser, S) or lysine (Lys, K);

Xaa33 is serine (Ser, S) or lysine (Lys, K);

Xaa34 is glycine (Gly, G), asparagine (Asn, N), or serine (Ser, S);
Xaa35 is alanine (Ala, A), glutamine (Gln, Q), or aspartic acid (Asp, D);
Xaa36 is proline (Pro, P) or tryptophan (Trp, W);
Xaa37 is proline (Pro, P) or lysine (Lys, K);
Xaa38 is proline (Pro, P) or histidine (His, H);
Xaa39 is serine (Ser, S), cysteine (Cys, C), or asparagine (Asn, N);
Xaa40 is cysteine (Cys, C), lysine (Lys, K), tyrosine (Tyr, Y), or isoleucine (Ile, I), or is absent;
Xaa41 is lysine (Lys, K) or threonine (Thr, T), or is absent;
Xaa42 is glutamine (Gln, Q) or is absent;
Xaa43 is cysteine (Cys, C) or is absent.

An example kind of such a peptide may include any one amino acid sequence selected from the group consisting of SEQ ID NOs: 1 to 44.

However, when any one amino acid from Xaa40 to Xaa43 is absent in General Formula 1, the subsequent amino acid sequence may be absent. As an example, when Xaa40 is absent, Xaa41 to Xaa43 may be absent. As another example, when Xaa41 is absent, Xaa42 to Xaa43 may be absent.

In another embodiment, the peptide may include an amino acid sequence represented by General Formula 2 below:

```
Xaa1-aminoisobutyric acid (Aib)-Glu-Gly-Thr-Phe-
Thr-Ser-Asp-Tyr-Ser-Xaa12-Xaa13-Leu-Xaa15-Xaa16-
Xaa17-Xaa18-Xaa19-Xaa20-Xaa21-Phe-Val-Xaa24-Trp-
Leu-Xaa27-Xaa28-Xaa29-Xaa30-Pro-Ser-Ser-Gly-Xaa35-
Pro-Pro-Pro-Ser-Xaa40-Xaa41
(General Formula 2)
```

In General Formula 2,
Xaa1 is tyrosine (Tyr, Y) or histidine (His, H);
Xaa12 is isoleucine (Ile, I) or lysine (Lys, K);
Xaa13 is alanine (Ala, A), Aib, or tyrosine (Tyr, Y);
Xaa15 is aspartic acid (Asp, D) or glutamic acid (Glu, E);
Xaa16 is lysine (Lys, K) or glutamic acid (Glu, E);
Xaa17 is isoleucine (Ile, I), lysine (Lys, K), arginine (Arg, R), or glutamine (Gln, Q);
Xaa18 is alanine (Ala, A), arginine (Arg, R),
Xaa19 is alanine (Ala, A), glutamine (Gln, Q), or cysteine (Cys, C);
Xaa20 is arginine (Arg, R), lysine (Lys, K), Aib, or glutamine (Gln, Q);
Xaa21 is glutamic acid (Glu, E), aspartic acid (Asp, D), alanine (Ala, A), or Aib;
Xaa24 is glutamine (Gln, Q) or asparagine (Asn, N);
Xaa27 is leucine (Leu, L) or isoleucine (Ile, I);
Xaa28 is aspartic acid (Asp, D), asparagine (Asn, N), or alanine (Ala, A);
Xaa29 is glycine (Gly, G) or histidine (His, H);
Xaa30 is glycine (Gly, G) or histidine (His, H);
Xaa35 is alanine (Ala, A) or glutamine (Gln, Q);
Xaa40 is cysteine (Cys, C), lysine (Lys, K), or tyrosine (Tyr, Y);
Xaa41 is Lysine (Lys, K) or is absent.

An example of such peptides may include any one amino acid sequence selected from the group consisting of SEQ ID NOs: 14, 15, 16, 20, 36, 37, 38, and 40.

In another embodiment, in General Formula 2,
Xaa1 is tyrosine (Tyr, Y),
Xaa12 is isoleucine (Ile, I);
Xaa13 is alanine (Ala, A) or Aib;
Xaa15 is aspartic acid (Asp, D) or glutamic acid (Glu, E);
Xaa16 is Lysine (Lys, K);
Xaa17 is glutamine (Gln, Q);
Xaa18 is alanine (Ala, A);
Xaa19 is alanine (Ala, A) or glutamine (Gln, Q);
Xaa20 is arginine (Arg, R), Aib, or glutamine (Gln, Q);
Xaa21 is aspartic acid (Asp, D) or alanine (Ala, A);
Xaa24 is glutamine (Gln, Q) or asparagine (Asn, N);
Xaa27 is leucine (Leu, L) or isoleucine (Ile, I);
Xaa28 is alanine (Ala, A);
Xaa29 is glycine (Gly, G);
Xaa30 is glycine (Gly, G);
Xaa35 is alanine (Ala, A);
Xaa40 is cysteine (Cys, C);
Xaa41 may be absent.

An example kind of such a peptide may include any one amino acid sequence selected from the group consisting of SEQ ID NOs: 20, 36, and 40.

In another embodiment, in General Formula 1,
R1 is absent,
Xaa1 is tyrosine (Tyr, Y),
Xaa7 is threonine (Thr, T);
Xaa12 is isoleucine (Ile, I);
Xaa13 is alanine (Ala, A) or Aib;
Xaa14 is leucine (Leu, L);
Xaa15 is aspartic acid (Asp, D) or glutamic acid (Glu, E);
Xaa16 is lysine (Lys, K);
Xaa17 is glutamine (Gln, Q);
Xaa18 is alanine (Ala, A);
Xaa19 is glutamine (Gln, Q);
Xaa20 is arginine (Arg, R), or glutamine (Gln, Q);
Xaa21 is aspartic acid (Asp, D) or alanine (Ala, A);
Xaa23 is valine (Val, V);
Xaa24 is glutamine (Gln, Q) or asparagine (Asn, N);
Xaa27 is leucine (Leu, L) or isoleucine (Ile, I);
Xaa28 is alanine (Ala, A);
Xaa29 is glycine (Gly, G);
Xaa30 is glycine (Gly, G);
Xaa31 is proline (Pro, P);
Xaa32 is serine (Ser, S);
Xaa33 is serine (Ser, S),
Xaa34 is glycine (Gly, G);
Xaa35 is alanine (Ala, A);
Xaa36 is proline (Pro, P);
Xaa37 is proline (Pro, P);
Xaa38 is proline (Pro, P);
Xaa39 is serine (Ser, S),
Xaa40 is cysteine (Cys, C);
Xaa41 to Xaa43 may be absent.

In another embodiment, the peptide may include any one amino acid sequence selected from the group consisting of SEQ ID NOs: 1 to 44. In addition, the peptide may consist essentially of any one amino acid sequence selected from the group consisting of SEQ ID NOs: 1 to 44, or the peptide may consist of any one amino acid sequence selected from the group consisting of SEQ ID NOs: 1 to 44.

In another embodiment, the peptide may include any one amino acid sequence selected from the group consisting of SEQ ID NOs: 14, 15, 16, 20, 36, 37, 38, and 40. In addition, the peptide consists essentially of any one amino acid sequence selected from the group consisting of SEQ ID NOs: 14, 15, 16, 20, 36, 37, 38, and 40, or the peptide is SEQ ID NO: 14, 15, 16, or the peptide may be consist of any one amino acid sequence selected from the group consisting of 14, 15, 16, 20, 36, 37, 38, and 40.

In an embodiment, the peptide may include any one amino acid sequence selected from the group consisting of SEQ ID NOs: 20, 36, and 40. In addition, the peptide may consist essentially of any one amino acid sequence selected from the group consisting of SEQ ID NOs: 20, 36, and 40, or the peptide may consist of any one amino acid sequence selected from the group consisting of SEQ ID NOs: 20, 36, and 40.

Even when the wording "peptide consisting of a specific sequence number" is used, as long as having the same activity as or corresponding activity to the peptide consisting of the corresponding sequence number, meaningless sequence addition before and after the amino acid sequence of the corresponding sequence number, or naturally-occurring mutants, or silent mutations thereof are not excluded, and even the case of the sequence addition or having mutants belongs to the scope of the present disclosure. That is, even in the case where there are differences in some sequences, when a certain level or higher of sequence identity exists and there is activity against the GLP-1 receptor and GIP receptor, all these cases belong to the scope of the present disclosure. Specifically, the peptide may include an amino acid sequence having an identity of 40%, 45%, 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99% or more with respect to of the amino acid sequences of SEQ ID NOs: 1 to 44.

The term "homology" or "identity" refers to the degree to which two given amino acid sequences or base sequences are related to each other and can be expressed as a percentage. Whether any two peptide sequences have homology, similarity or identity may be determined by, for example, known computer algorithms such as the "FASTA" program using default parameters shown in Pearson et al (1988) [Proc. Natl. Acad. Sci. USA 85]: 2444. In an embodiment, as performed by, for example, Needleman program of EMBOSS package (EMBOSS: The European Molecular Biology Open Software Suite, Rice et al., 2000, Trends Genet. 16: 276-277)(version 5.0.0 or later), Needleman-Wunsch algorism (Needleman and Wunsch, 1970, J. Mol. Biol. 48: 443-453) may be used therefor (GCG program package (Devereux, J., et al, Nucleic Acids Research 12: 387 (1984)), BLASTP, BLASTN, FASTA (Atschul, [S.] [F.,] [ET AL, J MOLEC BIOL 215]: 403 (1990); Guide to Huge Computers, Martin J. Bishop, [ED.,] Academic Press, San Diego, 1994, and [CARILLO ETA/.](1988) SIAM J Applied Math 48: 1073). For example, BLAST of the National Center for Biotechnology Information Database, or ClustalW may be used to determine homology, similarity, or identity.

Homology, similarity or identity of peptides may be determined by comparing sequence information using GAP computer program, for example, Needleman et al. (1970), J Mol Biol. 48: 443 as disclosed in Smith and Waterman, Adv. Appl. Math (1981) 2:482. In summary, the GAP program defines the homology, similarity or identity of peptides as a value obtained by the number similarly aligned symbols (i.e. amino acids) by the total number of symbols in the shorter of the two sequences. The default parameters for the GAP program may include: (1) a binary comparison matrix (containing value 1 for identity and value 0 for non-identity) and weighted comparison matrix of Gribskov et al (1986) Nucl. Acids Res. 14: 6745 (or EMBOSS version of EDNAFULL (NCBI NUC4.4) substitution matrix) as disclosed in Schwartz and Dayhoff, eds., Atlas Of Protein Sequence And Structure, National Biomedical Research Foundation, pp. 353-358 (1979); (2) a penalty of 3.0 for each gap and an additional penalty of 0.10 for each symbol in each gap (or gap opening penalty of 10, gap extension penalty of 0.5); and (3) no penalty for end gaps. Thus, the term "homology" or "identity" used herein refers to a relevance between sequences.

The peptide according to any one of the preceding embodiments may include an intramolecular bridge, and specifically, may have a ring-containing form. The intramolecular bridge may be, for example, a covalent bridge or a non-covalent bridge.

In the peptide according to any one of the preceding embodiments, the 12th amino acid and the 16th amino acid, or the 16th amino acid and the 20th amino acid from the N-terminus in the peptide sequence may form a ring with each other, but the structure of the peptide is not limited thereto.

In the peptide according to any one of the preceding embodiments, Xaa12 and Xaa16, or Xaa16 and Xaa20 may form a ring with each other, but the present disclosure is not particularly limited thereto. For example, in the peptides represented by SEQ ID NOs: 1, 12, and 13, Xaa12 and Xaa16 may form a ring with each other. In another example, in the peptides represented by SEQ ID NOs: 2 to 11, 15, and 22 to 25, Xaa16 and Xaa20 may form a ring with each other.

Non-limiting examples of the ring may include a lactam bridge (or lactam ring). Such a ring may be formed between amino acid side chains in the peptide, and for example, a lactam ring may be formed between a side chain of lysine and a side chain of glutamic acid, but the ring is not particularly limited thereto.

In an embodiment, a peptide containing the amino acid sequence of General Formula 1 can be prepared by combining several methods of preparing various peptides.

A peptide according to one aspect may be synthesized by a method well known in the art, which varies depending on a length thereof. Examples of the method include synthesizing using an automatic peptide synthesizer or genetic engineering technology. Specifically, the peptides may be prepared by standard synthetic methods, recombinant expression systems, or any other methods in the art. Thus, peptides according to one aspect can be synthesized by using many methods including the following, but the methods are not limited to:

(a) synthesizing peptides stepwise or by fragment assembly by means of solid-phase or liquid-phase methods, and isolating and purifying the final peptide product; or (b) expressing a nucleic acid construct encoding the peptide in a host cell and recovering the expression product from the host cell culture; or (c) performing cell-free in vitro expression of a nucleic acid construct encoding a peptide and recovering the expression product; or obtaining a peptide fragment by any combination of (a), (b) and (c), then linking the fragments to obtain a peptide, and recovering the peptide.

In addition, the preparation of the peptide may include modification using an L-type or D-type amino acid, and/or a non-natural amino acid; and/or modification by changing a native-type sequence, for example, modification of side chain functional groups, or modification by intramolecular covalent linkages, for example, inter-side chain ring formation, methylation, acylation, ubiquitination, phosphorylation, aminohexanation, biotinylation, etc. In addition, the modifications include all substitutions with non-natural compounds.

Substituted or added amino acids used in the modification may use 20 amino acids commonly observed in human proteins as well as atypical or non-naturally occurring amino acids. Commercial sources of atypical amino acids may include, but are not limited to, Sigma-Aldrich, Chem Pep and Genzyme pharmaceuticals. For example, am inoisobutyric acid (Aib) may be prepared by Streker's amino acid synthesis in acetone, but the method thereof is not limited thereto. Peptides sequences containing such atypical or non-naturally occurring amino acids and typical peptide sequences may be synthesized and purchased from, but are limited to, commercialized peptide synthesis companies, such as American Peptide Company or Bachem in the US or Anygen in Korea.

In addition, the peptide may have an unmodified N-terminus and/or C-terminus. However, the following peptides are also be included in the category of peptides according to the above aspect: the N-terminus and/or C-terminus thereof may be chemically modified or protected from organic groups to protect from protein cleavage enzymes in vivo and increase stability; or amino acids are added to, for example, the ends of the peptides, etc. to carry out the modification. When the C-terminus is not modified, the end of the peptide has a free carboxyl group, but the present disclosure is not particularly limited thereto.

In particular, in the case of chemically synthesized peptides, since the N- and C-termini are charged, the N-terminus and/or C-terminus may be modified to remove these charges. For example, the N-terminus may be subjected to acetylation and/or the C-terminus may be subjected to amidation, but the present disclosure is not particularly limited thereto.

In an embodiment, the peptide may have the C-terminus thereof as being unmodified or amidated, but the present disclosure is not limited thereto.

The peptide includes a peptide itself, a salt thereof (for example, a pharmaceutically acceptable salt of the peptide) or a solvate thereof.

The type of salt is not particularly limited. However, it is preferable to be in a form that is safe and effective for subjects, for example mammals, but the present disclosure is not particularly limited thereto.

In addition, the peptide may be in any form that is pharmaceutically acceptable.

The term "pharmaceutically acceptable" used herein refers to an amount that is sufficient to exhibit a therapeutic effect and does not cause side effects, and may be easily determined by a person skilled in the art according to factors well known in the medical field, such as the type of disease, the age, weight, health, and sex of the patient, patient's sensitivity to drugs, route of administration, an administration method, the number of administrations, a treatment period, drugs used in combination or simultaneously.

In an embodiment, the peptide may be in the form of a pharmaceutically acceptable salt thereof. The salt include: conventional acid addition salts used in the pharmaceutical field, for example, in the field of diabete therapeutics, for example, salts derived from inorganic acids such as hydrochloric acid, hydrobromic acid, sulfuric acid, sulfamic acid, phosphoric acid or nitric acid; and salts derived from organic acids such as acetic acid, propionic acid, succinic acid, glycolic acid, stearic acid, citric acid, maleic acid, malonic acid, methanesulfonic acid, tartaric acid, malic acid, phenylacetic acid, glutamic acid, benzoic acid, salicylic acid, 2-acetoxybenzoic acid, fumaric acid, toluenesulfonic acid, oxalic acid, or trifluoroacetic acid. In addition, the salt may be a base addition salt such as ammonium, dimethylamine, monomethylamine, monoethylamine, or diethylamine. In addition, the salt includes a common metal salt form, for example, a salt derived from a metal such as lithium, sodium, potassium, magnesium, or calcium. The acid addition salt, the base addition salt, or the metal salt may be prepared according to a conventional method. Pharmaceutically acceptable salts and general methodologies for the preparation thereof are well known in the art. For example, the document [P. Stahl, et al. Handbook of Pharmaceutical Salts: Properties, Selection and Use, 2nd Revised Edition (Wiley-VCH, 2011)]; [S. M. Berge, et al., "Pharmaceutical Salts," Journal of Pharmaceutical Sciences, Vol. 66, No. 1, January 1977] may be referred to.

For the condensation of the protected amino acid or peptide, various activating reagents useful in peptide synthesis, for example, triphosphonium salt, tetramethyluronium salt, carbodiimide and the like may be used. Examples of triphosphonium salts include benzotriazol-1-yloxytris (pyrrolazino)phosphonium hexafluorophosphate (PyBOP), bromotris(pyrrolazino)phosphonium hexafluorophosphate (PyBroP), and 7-azabenzotriazol-1-yloxytris(pyrrolazino) phosphonium hexafluorophosphate (PyAOP), examples of tetramethyluronium salts include 2-(1H-benzotriazol-1-yl)-1,1,3,3-tetramethyluronium hexafluorophosphate (H BTU), 2-(7-azabenzotriazol-1-yl)-1,1,3,3-tetramethyluronium hexafluorophosphate (HATU), 2-(1H-benzotriazol-1-yl)-1,1,3,3-tetramethyluronium tetrafluoroborate (TBTU), 2-(5-norbonane-2,3-dicarboxyimide)-1,1,3,3-tetramethyluronium tetrafluoroborate (TNTU), and O—(N-succimidyl)-1, 1,3,3-tetramethyluronium tetrafluoroborate (TSTU), andexamples of carbodiim ides include N,N'-dicyclohexyl-carbodiimide (DCC), N,N'-diisopropylcarbodiimide (DIPCDI), and N-ethyl-N'-(3-dimethylaminopropyl)carbodiimide hydrochloride (EDCI·HCl). For condensation using these, racemization inhibitors [for example, N-hydroxy-5-norbornene-2,3-dicarboxylic acid imide (HONB), 1-hydroxybenzotriazole (HOBt), 1-hydroxy-7-azabenzotriazole (HOAt), 3,4-dihydro-3-hydroxy-4-oxo-1,2,3-benzotriazine (HOOBt), andethyl 2-cyano-2-(hydroxyimino)acetate (Oxyma, etc.) may be added. The solvent used for the condensation may be appropriately selected from those known to be useful for peptide condensation reactions. For example, acid amides such as anhydrous or water-containing N, N-dimethylformamide, N, N-dimethylacetamide, N-methylpyrrolidone, etc.; halogenated hydrocarbons such as methylene chloride, chloroform, etc.; alcohols such as fluoroethanol, phenol, etc.; sulfoxides such as dimethyl sulfoxide, etc.; tertiary amines such as pyridine, etc.; ethers such as dioxane, tetrahydrofuran, etc.; nitriles such as acetonitrile, propionitrile, etc.; esters such as methyl acetate, ethyl acetate, etc.; suitable mixtures thereof, may be used. The reaction temperature may be appropriately selected from a range known to be usable for the peptide bonding reaction, and is usually selected from the range of about −20° C. to 90° C. Activated amino acid derivatives may be usually used in excess of 1.5 fold to 6 fold. Regarding the solid phase synthesis, when a test using a ninhydrin reaction indicates that the condensation is insufficient, sufficient condensation may be performed by repeating the condensation reaction without removing the protecting group. When condensation is still insufficient even after repeating the reaction, since the unreacted amino acid can be acetylated with an acid anhydride, acetylimidazole or the like, the influence thereof on the subsequent reaction may be avoided.

Examples of protecting groups for the amino group of the starting amino acid are benzyloxycarbonyl (Z), tert-butoxycarbonyl (Boc), tert-pentyloxycarbonyl, isobornyloxycarbonyl, 4-methoxybenzyloxy Carbonyl, 2-chlorobenzyloxycarbonyl (Cl—Z), 2-bromobenzyloxycarbonyl (Br—Z), adamantyloxycarbonyl, trifluoroacetyl, phthaloyl, formyl, 2-nitrophenylsulfenyl, diphenylphosphinothioyl, 9-fluorenylmethyloxycarbonyl (Fmoc), and trityl.

Examples of carboxyl-protecting groups for starting amino acids include, in addition to $C_{1-6}$ alkyl groups, $C_{3-10}$ cycloalkyl groups, and $C_{7-14}$ aralkyl groups described above, aryl, 2-adamantyl, 4-nitrobenzyl, 4-methoxybenzyl, 4-chlorobenzyl, fenacil, benzyloxycarbonylhydrazide, tert-butoxycarbonylhydrazide, and tritylhydrazide.

The hydroxyl groups of serine or threonine may be protected by, for example, esterification or etherification. Examples of groups suitable for esterification include groups derived from lower ($C_{2-4}$) alkanoyl groups such as acetyl groups, aroyl groups such as benzoyl groups, organic acids and the like. Additionally, examples of groups suitable for etherification include benzyl, tetrahydropyranyl, tert-butyl ($Bu^t$), trityl (Trt), and the like.

Examples of protecting groups for the phenolic hydroxyl group of tyrosine include Bzl, 2,6-dichlorobenzyl, 2-nitrobenzyl, Br—Z, tert-butyl, and the like.

Examples of protecting groups for imidazole of histidine include p-toluenesulfonyl (Tos), 4-m ethoxy-2,3,6-trim ethylbenzenesu lfonyl (Mtr), d in itrophenyl (DNP), benzyloxymethyl (Bom), tert-butoxymethyl (Bum), Boc, Trt, Fmoc, and the like.

Examples of protecting groups for the guanidino group of arginine include Tos, Z, 4-methoxy-2,3,6-trimethylbenzenesulfonyl (Mtr), p-methoxybenzenesulfonyl (MBS), 2,2, 5,7, 8-pentamethylchroman-6-sulfonyl (Pmc), mesitylene-2-sulfonyl (Mts), 2,2,4,6,7-pentamethyldihydrobenzofuran-5-sulfonylphonyl (Pbf), Boc, Z, NO2, and the like.

Examples of protecting groups for side chain amino groups of lysine include Z, Cl—Z, trifluoroacetyl, Boc, Fmoc, Trt, Mtr, 4,4-dimethyl-2,6-dioxocyclohexylidenyl (Dde), and the like.

Examples of protecting groups for indolyl of tryptophan include formyl (For), Z, Boc, Mts, Mtr, and the like.

Examples of protecting groups for asparagine and glutamine include Trt, xantyl (Xan), 4,4'-dimethoxybenzhydryl (Mbh), 2,4,6-trimethoxybenzyl (Tmob), and the like.

Examples of activated carboxyl groups in the starting material include corresponding acid anhydrides, azides, active esters [esters with alcohols (for example, pentachlorophenol, 2,4,5-trichlorophenol, 2,4-dinitrophenol, cyanomethyl alcohol, paranitrophenol, HONB, N-hydroxysuccimide, 1-hydroxybenzotriazole (HOBt), 1-hydroxy-7-azabenzotriazole (HOAt))], etc. Examples of activated amino groups in the starting material include a corresponding phosphorus amide.

Examples of methods of removing the protecting group include: a catalytic reduction in a hydrogen stream in the presence of a catalyst such as Pd-black or Pd-carbon; an acid treatment usinganhydrous hydrogen fluoride, methanesulfonic acid, trifluoromethanesulfonic acid, trifluoroacetic acid (TFA), trimethylsilyl bromide (TMSBr), trimethylsilyl trifluoromethanesulfonate, tetrafluoroboric acid, tris(trifluoro) boric acid, boron tribromide, or a mixture solution thereof; a base treatment using diisopropylethylamine, triethylamine, piperidine, piperazine, etc.; and a reduction using sodium in liquid ammonia; and the like. The removal reaction by acid treatment described above is generally carried out at a temperature of –20° C. to 40° C.; and the acid treatment may be efficiently performed by adding anisole, phenol, thioanisole, metacresol, and paracresol; or a cation scavenger such as dimethylsulfide, 1,4-butanedithiol, 1,2-ethanedithiol, triisopropylsilane, and the like. In addition, the 2,4-dinitrophenyl group used as the protecting group of the imidazole of histidine is removed by thiophenol treatment; and the formyl group used as a protecting group for the indole of tryptophan is removed by deprotection performed by not only an acid treatment in the presence of 1,2-ethanedithiol and 1,4-butanedithiol, but also an alkali treatment with diluted sodium hydroxide and diluted ammonia.

Protection of a functional group that should not be involved in the reaction between the starting material and the protecting group, the removal of the protecting group, the activation of a functional group involved in the reaction, and the like could be appropriately selected from known protecting groups and known means.

For the peptides described herein, the left end is the N-terminus (amino terminus) and the right end is the C-terminus (carboxyl terminus), according to conventional peptide markings. The C-terminus of the peptide may be one of amide (—$CONH_2$), a carboxyl group (—COOH), carboxylate (—COO—), alkylamide (—CONHR' where R' is alkyl), and ester (—COOR' where R' is an alkyl or an aryl).

In the method for preparing an amide of a peptide, it is formed by solid phase synthesis using a resin for amide synthesis, or the α-carboxyl group of a carboxy terminal amino acid is amidated, and a peptide in which the peptide chain is elongated toward the amino group in a desired chain length. and then, the protecting group for the N-terminal α-amino group of the peptide chain only is removed and a peptide in which only the protecting group for the C-terminal carboxyl group is removed from the peptide chain, are prepared, and these two peptides are condensed in the mixed solvents described above. Regarding the details of the condensation reaction, the same as described above applies herein. After the protected peptide obtained by condensation is purified, all protecting groups may be removed by the method described above to obtain the desired peptide. By purifying this peptide using various publicly known means for purification of the major fraction and freeze-drying, the desired amide of the peptide may be prepared.

In an embodiment, the peptide may be in the form of a solvate thereof. The term "solvate" used herein refers to a case where the peptide or a salt thereof forms a complex with solvent molecules.

Another aspect provides a polynucleotide encoding the GLP-1/GIP dual agonist.

The GLP-1/GIP dual agonist is the same as described above.

The polynucleotide may be an isolated polynucleotide.

The polynucleotide includes DNA and RNA which encode a target protein.

The polynucleotide may be modified. Such modifications include additions, deletions, or non-conservative or conservative substitutions of nucleotides.

The polynucleotide may consist of a nucleotide sequence having the sequence identity of at least 80%, at least 85%, at least 90%, at least 95%, at least 96%, at least 97%, at least 98%, at least 99% with the corresponding sequence.

Another aspect provides a vector including the polynucleotide.

The term "vector" refers to a means for expressing a target gene in a host cell. Examples thereof include viral vectors such as plasmid vectors, cosmid vectors, bacteriophage vectors, adenovirus vectors, retrovirus vectors, and adeno-associated viral vectors. A vector that can be used as the recombinant vector may be prepared by manipulating a plasm id often used in the art (for example, pSC101, pGV1106, pACYC177, ColE1, pKT230, pME290, pBR322, pUC8/9, pUC6, pBD9, pHC79, pIJ61, pLAFR1, pHV14, pGEX series, pET series, pUC19, p426GPD, etc.), phages (for example, λgt4λB, A-Charon, AL21, and M13, etc.), or viruses (for example, CMV, SV40, etc.), but the present disclosure is not limited thereto. Since the plasmid is the most commonly used form of vector, "plasmide" and "vector" used herein may be sometimes used interchangeably herein.

In the recombinant vector, a polynucleotide encoding a GLP-1/GIP dual agonist may be operably linked to a promoter. The term "operably linked" refers to a case where a promoter sequence that initiates and mediates the transcription of a polynucleotide encoding a target protein is functionally linked to the polynucleotide sequence.

The recombinant vector may typically be constructed as a vector for cloning or a vector for expression. As the expression vector, conventional vectors used in the art to express foreign proteins in plants, animals, or microorganisms may be used. The recombinant vector may be constructed through various methods known in the art.

The recombinant vector may be constructed using a prokaryotic or eukaryotic cell as a host. For example, when the vector used is an expression vector and a prokaryotic cell is used as a host, a strong promoter capable of promoting transcription (for example, pLλ promoter, trp promoter, lac promoter, tac promoter, T7 promoter, etc.), ribosome binding sites for initiation of translation, and transcription/translation termination sequences, may be included. When a eukaryotic cell is used as a host, replication origins that operate in eukaryotic cells included in the vector include the f1 origin of replication, the SV40 origin of replication, the pMB1 origin of replication, the adeno origin of replication, the AAV origin of replication, the CMV origin of replication, and the BBV origin of replication. However, the present disclosure is not limited thereto. In addition, promoters derived from the genome of mammalian cells (for example, metallotionine promoter) or promoters derived from mammalian viruses (for example, adenovirus late promoter, vaccinia virus 7.5K promoter, SV40 promoter, cytomegalovirus (CMV) promoter and HSV's tk promoter) may be used, and usually have a polyadenylation sequence as a transcription termination sequence.

Another aspect provides a host cell containing the polynucleotide or the vector.

The host cell may be an isolated cell.

As a host cell that can be transformed with a recombinant vector, a host with high efficiency of DNA introduction and high expression efficiency of the introduced DNA may be used. For example, known eukaryotic and prokaryotic hosts such as *Escherichia coli, Pseudomonas, Bacillus, Streptomyces*, Fungi, and yeast, insect cells such as *Spodoptera frugiperda* (SF 9), and animal cells of CHO, COS 1, COS 7, BSC 1, BSC40, BMT 10, etc. may be used, but the present disclosure is e not limited thereto.

A method widely known in the art may be used to insert a polynucleotide or a recombinant vector containing the same into a host cell. As an example of a delivery method, when the host cell is a prokaryotic cell, a calcium chloride ($CaCl_2$)) method or an electroporation method may be used, and when the host cell is a eukaryotic cell, a microinjection method, a calcium phosphate precipitation method, an electroporation method, liposome-mediated transfection, and gene bombardment, etc. may be used, but the present disclosure is not limited thereto.

The polynucleotide may be introduced into a host cell in the form of an expression cassette, which is a genetic construct containing all elements required for self-expression. The expression cassette may include a promoter operably linked to the polynucleotide, a transcription termination signal, a ribosome binding site, and a translation termination signal. The expression cassette may be in the form of an expression vector capable of self-replication. In addition, the polynucleotide may be introduced into a host cell in its own form and operably linked to a sequence necessary for expression in the host cell, but the present disclosure is not limited thereto.

Another aspect provides a conjugate in which the GLP-1/GIP dual agonist is combined with a biocompatible material increasing in vivo half-life.

The GLP-1/GIP dual agonist is as described above.

The biocompatible material may be used interchageably with a carrier.

The conjugate may be an isolated conjugate.

The conjugate exhibits activity equal to or higher than that of native-type ligand (i.e., native-type GLP-1 and native-type GIP), and at the same time, increased potency persistence, compared to a native-type ligand or a derivative thereof to which a carrier is not bound. Therefore, the conjugate may be a long-acting conjugate. The term "long-acting conjugate" used herein refers to a conjugate with increased durability compared to native-type GIP or GIP derivatives to which a biocompatible material is not bound. Therefore, the conjugate may be used interchangeably with "long-acting GLP-1/GIP dual agonist conjugate," "long-acting GLP-1/GIP dual agonist," "long-acting GLP-1/GIP conjugate," "long-acting conjugate of dual agonist," "dual agonist conjugate," "long-acting conjugate," or "conjugate." Such conjugates include not only the above-described forms, but also forms encapsulated in biodegradable nanoparticles.

The conjugate may be a non-naturally occurring conjugate.

The biocompatible material may be bonded to the GLP-1/GIP dual agonist through a covalent chemical bond or a non-covalent chemical bond, and may be bound to each other through a linker (L) by a covalent chemical bond, a non-covalent chemical bond, or a combination thereof. One or more amino acid side chains within the GLP-1/GIP dual agonist may be conjugated to these biocompatible materials to increase solubility and/or half-life in vivo and/or increase bioavailability. Such modifications may reduce clearance of therapeutic proteins and peptides. The biocompatible materials may be water soluble (amphiphilic or hydrophilic) and/or non-toxic and/or pharmaceutically acceptable.

The biocompatible material may be selected from the group consisting of high-molecular-weight polymers, fatty acids, cholesterol, albumin and fragments thereof, albumin binding substances, polymers of repeating units of specific amino acid sequences, antibodies, antibody fragments, FcRn binding substances, in vivo connective tissues, nucleotides, fibronectin, transferrin, saccharides, heparin, and elastin, but the present disclosure is not particularly limited thereto.

Examples of the polymers include a high-molecular-weight polymer selected from the group consisting of polyethylene glycol (PEG), polypropylene glycol, ethylene glycol-propylene glycol copolymers, polyoxyethylated polyols, polyvinyl alcohol, polysaccharides, polyvinyl ethyl ether, biodegradable polymers, lipid polymers, chitin, hyaluronic acid, oligonucleotides, and combinations thereof, and the polysaccharides may be dextran, but the present disclosure is not particularly limited thereto.

The polyethylene glycol is a term encompassing all types of ethylene glycol homopolymers, PEG copolymers, and monomethyl-substituted PEG polymers (m PEG), but the present disclosure is not particularly limited thereto.

The fatty acid may have a binding force with albumin in vivo, but the present disclosure is not particularly limited thereto.

The biocompatible material includes, but is not limited to, poly-amino acids such as poly-lysine, poly-aspartic acid and poly-glutamic acid.

In the case of the elastin, human tropoelastin, which is a water-soluble prewncursor, may be used, and a polymer of some sequences or some repeating units thereof may be used. For example, all elastin-like polypeptides may be included. However, the present disclosure is not particularly limited thereto.

In an embodiment, the biocompatible material may be an FcRn binding material. For example, the FcRn binding material may be an immunoglobulin Fc region, for example, an IgG Fc region, or a non-glycosylated IgG4 Fc region, but the present disclosure is not particularly limited thereto.

The term "immunoglobulin Fc region" used herein refers to a region including constant region 2(CH2) of the heavy chain and/or constant region 3 (CH3) of the heavy chain, excluding the variable region of the heavy chain and the variable region of the light chain of immunoglobulin. The immunoglobulin Fc region may be one component constituting a moiety of a conjugate according to one aspect.

Such an immunoglobulin Fc region may include a hinge portion in a constant region of the heavy chain, but the present disclosure is not limited thereto.

In an embodiment, an immunoglobulin Fc region may include a specific hinge sequence at the N-terminus thereof.

The term "hinge sequence" refers to a site located in the heavy chain to form a dimer of an immunoglobulin Fc fragment through an inter disulfide bond.

In an embodiment, the hinge sequence may be mutated such that a part of the hinge sequence having the following amino acid sequence is deleted to leave only one cysteine residue:

```
                                              (SEQ ID NO 45)
Glu-Ser-Lys-Tyr-Gly-Pro-Pro-Cys-Pro-Ser-Cys-Pro.
```

The hinge sequence may include a case where only one cysteine residue remains by deletion of the 8th or 11th cysteine residue of the hinge sequence of SEQ ID NO: 45. A hinge sequence according to an embodiment may consist of 3 to 12 amino acids including only one cysteine residue, but the present disclosure is not limited thereto. For example, the hinge sequence according to an embodiment may have the following sequence: Glu-Ser-Lys-Tyr-Gly-Pro-Pro-Pro-Ser-Cys-Pro(SEQ ID NO 46), Glu-Ser-Lys-Tyr-Gly-Pro-Pro-Cys-Pro-Ser-Pro(SEQ ID NO 47), Glu-Ser-Lys-Tyr-Gly-Pro-Pro-Cys-Pro-Ser (SEQ ID NO 48), Glu-Ser-Lys-Tyr-Gly-Pro-Pro-Cys-Pro-Pro(SEQ ID NO 49), Lys-Tyr-Gly-Pro-Pro-Cys-Pro-Ser (SEQ ID NO 50), Glu-Ser-Lys-Tyr-Gly-Pro-Pro-Cys (SEQ ID NO 51), Glu-Lys-Tyr-Gly-Pro-Pro-Cys (SEQ ID NO 52), Glu-Ser-Pro-Ser-Cys-Pro(SEQ ID NO 53), Glu-Pro-Ser-Cys-Pro(SEQ ID NO 54), Pro-Ser-Cys-Pro(SEQ ID NO 55), Glu-Ser-Lys-Tyr-Gly-Pro-Pro-Ser-Cys-Pro(SEQ ID NO 56), Lys-Tyr-Gly-Pro-Pro-Pro-Ser-Cys-Pro(SEQ ID NO 57), Glu-Ser-Lys-Tyr-Gly-Pro-Ser-Cys-Pro(SEQ ID NO 58), Glu-Ser-Lys-Tyr-Gly-Pro-Pro-Cys (SEQ ID NO 59), Lys-Tyr-Gly-Pro-Pro-Cys-Pro(SEQ ID NO 60), Glu-Ser-Lys-Pro-Ser-Cys-Pro(SEQ ID NO 61), Glu-Ser-Pro-Ser-Cys-Pro(SEQ ID NO 62), Glu-Pro-Ser-Cys (SEQ ID NO 63), or Ser-Cys-Pro (SEQ ID NO 64).

For example, the hinge sequence may include an amino acid sequence of SEQ ID NO: 55 (Pro-Ser-Cys-Pro) or SEQ ID NO: 64 (Ser-Cys-Pro), but is not limited thereto.

The immunoglobulin Fc region according to an embodiment may have a form in which two molecules of the immunoglobulin Fc chain form a dimer due to the presence of a hinge sequence. In addition, in the conjugate of Formula 1 according to an embodiment, one end of the linker may be linked to one chain of the immunoglobulin Fc region of the dimer, but the present disclosure is not limited thereto.

The term "N-terminus" used herein refers to the amino terminus of a protein or a polypeptide, may include the most terminal of the amino terminus, or up to 1, 2, 3, 4, 5, 6, 7, 8, 9, 10 or more amino acids from the most terminal. The immunoglobulin Fc fragment of the present disclosure may include a hinge sequence at the N-terminus, but is not limited thereto.

In addition, as long as having substantially the same as the native-type or improved effect compared thereto, the immunoglobulin Fc region may be an extended Fc region including some or all constant region 1 (CH1) of the heavy chain and/or constant region 1 (CL1) of the light chain, except for the variable region of the heavy chain and the variable region of the light chain. In addition, the immunoglobulin Fc region may be a region from which a relatively long amino acid sequence corresponding to CH2 and/or CH3 is removed.

For example, the immunoglobulin Fc region may be selected from the group consisting of: (a) a CH1 domain, a CH2 domain, a CH3 domain, and a CH4 domain; (b) a CH1 domain and a CH2 domain; (c) a CH1 domain and a CH3 domain; (d) a CH2 domain and a CH3 domain; (e) a combination of one or more of the CH1 domain, the CH2 domain, the CH3 domain, and the CH4 domain with an immunoglobulin hinge region or a portion of a hinge region; and (f) a dimer between each domain of the heavy chain constant region and the light chain constant region, but the present disclosure is not limited thereto.

The immunoglobulin Fc region may be in a dimeric form, and one molecule of the GLP-1/GIP dual agonist may be covalently linked to one Fc region of the dimer form, wherein the immunoglobulin Fc and the GLP-1/GIP dual agonists may be linked to each other by a non-peptide polymer. In an embodiment, two molecules of GLP-1/GIP dual agonist may bind symmetrically to one Fc region in the dimeric form. In this case, the immunoglobulin Fc and the GLP-1/GIP dual agonist may be linked to each other by a non-peptide linker. However, the present disclosure is not limited to the embodiments described above.

In addition, the immunoglobulin Fc region includes, in addition to native-type amino acid sequences, sequence derivatives thereof. The term "amino acid sequence derivative" used herein refers to a case where one or more amino acid residues in a natural amino acid sequence have different sequences due to deletion, insertion, non-conservative or conservative substitution, or a combination thereof.

For example, in the case of IgG Fc, 214th to 238th, 297th to 299the, 318th to 322nd, or 327th to 331st amino acid residues, which are known to be important for binding, may be used as suitable sites for modification. In addition, various derivatives may be obtained by removing a site capable of forming a disulfide bond, removing some amino acids at the N-terminus of native-type Fc, or adding a methionine residue to the N-terminus of native-type Fc. In addition, in order to eliminate the effector function, a complement binding site, for example, a C1q binding site, may be removed, and an antibody dependent cell mediated cytotoxicity (ADCC) site may be removed. Techniques for preparing sequence derivatives of the immunoglobulin Fc region are disclosed in International Patent Publication No. WO 97/34631 and International Patent Publication No. 96/32478.

Amino acid exchanges in proteins and peptides that do not entirely change the activity of the molecule are known in the art (H. Neurath, R. L. Hill, The Proteins, Academic Press, New York, 1979). The most commonly occurring exchanges are exchanges between amino acid residues Ala/Ser, Val/Ile, Asp/Glu, Thr/Ser, Ala/Gly, Ala/Thr, Ser/Asn, Ala/Val, Ser/Gly, Thy/Phe, Ala/Pro, Lys/Arg, Asp/Asn, Leu/Ile, Leu/Val, Ala/Glu, and Asp/Gly. In some cases, modification may be made by phosphorylation, sulfation, acrylation, glycosylation, methylation, farnesylation, acetylation, and amidation.

The Fc derivatives may exhibit biological activity equivalent to that of the Fc region, and of which structural stability of the Fc region against heat and pH may be increased.

In addition, such an Fc region may be obtained from a native-type isolated in vivo from human and an animal such as cow, goat, pig, mouse, rabbit, hamster, rat, or guinea pig, or may be recombinant or a derivative thereof, obtained from transformed animal cells or microorganisms. In this regard, a method of obtaining from the native-type may be a method in which whole immunoglobulin is isolated from a living body of a human or animal, and then treated with a proteolytic enzyme. When treated with papain, Fab and Fc are used for cleavage, and when treated with pepsin, pF'c and F(ab)$_2$ are used for cleavage. Fc or pF'c may be separated using size-exclusion chromatography or the like. In a more specific embodiment, the human-derived Fc region may be a recombinant immunoglobulin Fc region obtained from a microorganism.

In addition, the immunoglobulin Fc region may be in the form of a native-type glycan, a glycan which is increased compared to a native-type glycan, a glycan which is reduced compared to a native-type glycan, or a glycan-free form. For the increase or decrease in the immunoglobulin Fc glycan, conventional methods such as chemical methods, enzymatic methods, and genetic engineering methods using microorganisms may be used. In this regard, the immunoglobulin Fc region that is deglycosylated from Fc, has significantly reduced binding ability to complement (c1q), and the antibody-dependent cytotoxicity or complement-dependent cytotoxicity of the immunoglobulin Fc region is reduced or eliminated. Accordingly, unnecessary immune responses may not be caused in vivo. In this respect, a form that is more suitable for its original purpose as a drug carrier, may be an immunoglobulin Fc region that is deglycosylated or aglycosylated.

"Deglycosylation" used herein refers to an Fc region from which glucoses are removed by an enzyme, and "aglycosylation" used herein refers to an Fc region that is produced in a prokaryotic animal, for example, *Escherichia coli* and thus is not glycosylated.

In addition, the immunoglobulin Fc region may be an Fc region derived from IgG, IgA, IgD, IgE, or IgM, a combination thereof, or a hybrid thereof. In an embodiment, the immunoglobulin Fc region may be derived from IgG or IgM, which is most abundant in human blood. In an embodiment, and in a more specific embodiment, the immunoglobulin Fc region may be derived from IgG that is known to improve the half-life of ligand binding proteins. In an embodiment, the immunoglobulin Fc region may be an IgG4 Fc region, and in an embodiment, the immunoglobulin Fc region may be an aglycosylated Fc region derived from human IgG4, but the present disclosure is not limited thereto.

The term "combination" refers to a case where, when dimers or multimers are formed, a polypeptide encoding single-chain immunoglobulin Fc region of a same origin form bonds with a single-chain polypeptide of a different origin. That is, dimers or multimers may be prepared from two or more fragments selected from the group consisting of Fc fragments of IgG Fc, IgA Fc, IgM Fc, IgD Fc, and IgE.

The GLP-1/GIP dual agonist may be linked to a biocompatible material by a linker.

The linker may be a peptide linker or a non-peptide linker.

When the linker is a peptide linker, the linker may include at least one amino acid, for example, 1 amino acid to 1,000 amino acids, but embodiments are not particularly limited thereto. The peptide linker may include Gly, Asn, and Ser residues, and may also include neutral amino acids such as Thr and Ala. For the linkage between the biocompatible material and the GIP derivative, various known peptide linkers may be used. In addition, the number of copies "n" may be adjusted in consideration of linker optimization to achieve proper separation between functional moieties or to maintain essential inter-moiety interactions. Other soluble linkers are known in the art, and for example, a GS linker, in which not only a polar amino acid residue is added to improve water solubility, but also amino acid residues, such as T and A, are added to maintain flexibility may be used. Therefore, in an embodiment, the linker may be a flexible linker including G, S, and/or T residues. The linker may have a general formula selected from (GpSs)n and (SpGs)n, wherein, independently, p may be an integer of 1 to 10, s may be an integer of 0 to 10, the sum of p and S may be an integer of 20 or less, and n may be an integer of 1 to 20. In detail, the linker may have, for example, a general formula of (GGGGS)n (SEQ ID NO: 65), (SGGGG)n (SEQ ID NO: 66), (SRSSG)n (SEQ ID NO: 67), (SGSSC)n (SEQ ID NO: 68), (GKSSGSGSESKS)n (SEQ ID NO: 69), (RPPPPC)n (SEQ ID NO: 70), (SSPPPPC)n (SEQ ID NO: 71), (GST-SGSGKSSEGKG)n (SEQ ID NO: 72), (GST-SGSGKSSEGSGSTKG)n (SEQ ID NO: 73), (GST-SGSGKPGSGEGSTKG)n (SEQ ID NO: 74), or (EGKSSGSGSESKEF)n SEQ ID NO: 75), wherein n may be an integer of 1 to 20 or an integer of 1 to 10.

The "non-peptide linker" includes a biocompatible polymer to which two or more repeating units are bonded. The repeating units are linked to each other through any covalent bond other than a peptide bond. The non-peptide linker may be one component constituting the moiety of the conjugate.

The "non-peptide linker" may be used interchangeably with the "non-peptide polymer."

In an embodiment, in the conjugate, a biocompatible material and GLP-1/GIP dual agonist are covalently linked to each other via a non-peptide linker containing reactive groups at both ends thereof capable of binding to the biocompatible material, for example, an immunoglobulin Fc region, and the GLP-1/GIP dual agonist.

Specifically, the non-peptide linker may be selected from the group consisting of a fatty acid, a saccharide, a high-molecular-weight polymer, a low-molecular weight compound, a nucleotide, and a combination thereof.

Although not particularly limited thereto, the non-peptide linker may be selected from the group consisting of biodegradable polymers such as polyethylene glycol, polypropylene glycol, an ethylene glycol-propylene glycol copolymer, polyoxyethylated polyol, polyvinyl alcohol, polysaccharide, polyvinyl ethyl ether, polylactic acid (PLA), polylactic-glycolic acid (PLGA); and lipid polymers, chitins, hyaluronic acid, oligonucleotides, and combinations thereof. The polysaccharide may be dextran, but is not limited thereto.

In an embodiment, the non-peptide polymer may be polyethylene glycol, but is not limited thereto. Therefore, the linker may contain an ethylene glycol repeating unit. In addition, derivatives thereof already known in the art and derivatives that could be easily prepared at the level of skill in the art are also included in the scope of the present disclosure.

The non-peptide linker may be any linker that is a polymer resistant to in vivo proteolytic enzymes. The formula weight of the non-peptide polymer may be in the range of 1 kDa to 1000 kDa, specifically in the range of 1 kDa to 100 kDa, more specifically in the range of 1 kDa to 20 kDa, but is not limited thereto. In addition, for use as the non-peptide linker, not only one type of polymer but also a combination of different types of polymers may be used. In an embodiment, the formula weight of the ethylene glycol repeating unit may be in the range of 1 kDa to 100 kDa, for example, in the range of 1 kDa to 20 kDa.

In an embodiment, oppose ends of the non-peptide linker may bind to a biocompatible material, for example, an amine or thiol group of an immunoglobulin Fc region and an amine or thiol group of a GLP-1/GIP dual agonist, respectively.

For example, the non-peptide polymer may include a reactive group capable of binding to a biocompatible material (for example, an immunoglobulin Fc region) and a GLP-1/GIP dual agonist at oppose ends thereof, respectively, for example, a reactive group capable of binding to an amine group located at the N-terminus or lysine, or a thiol group of cysteine of a GLP-1/GIP dual agonist or a biocompatible material (for example, an immunoglobulin Fc region).

In an embodiment, the reactive group of the non-peptide polymer, which is capable of binding to a biocompatible material such as an immunoglobulin Fc region and a GLP-1/GIP dual agonist, may be selected from the group consisting of an aldehyde group, a maleimide group, and a succinimide derivative. However, the present disclosure is not limited thereto. In the above, examples of the aldehyde group include propion aldehyde group or butyl aldehyde group, but are not limited thereto. The succinimide derivatives include succinimidyl valerate, succinimidyl methylbutanoate, succinimidyl methylpropionate, succinimidyl butanoate, succinimidyl propionate, N-hydroxysuccinimid, hydroxy succinimidyl, succinimidyl carboxymethyl, or succinimidyl carbonate, but are not limited thereto.

In addition, end products produced by reductive alkylation by aldehyde linkages are much more stable than those linked by amide linkages. The aldehyde reactive group reacts selectively at the N-terminus at low pH, and may form a covalent bond with a lysine residue at high pH, for example, pH 9.0.

In addition, the reactive groups at oppose ends of the non-peptide linker may be the same or different from each other, and for example, a maleimide group may be located at one end and an aldehyde group, a propionaldehyde group, or a butyl aldehyde group may be located at the other end. However, the present disclosure is not limited thereto as long as a biocompatible material, for example, an immunoglobulin Fc region, and a GLP-1/GIP dual agonist could be respectively bound to ends of the non-peptide linker. For example, one end of the non-peptide linker may include a maleimide group as a reactive group, and the other end thereof may include an aldehyde group, a propion aldehyde group, or a butyl aldehyde group.

When the non-peptide polymer is a polyethylene glycol having hydroxyl groups at oppose ends, long-acting conjugates may be prepared by activating the hydroxy groups using various reactive groups by a known chemical reaction, or by using a polyethylene glycol having modified reactive groups, which is commercially available.

In an embodiment, the non-peptide polymer may be linked to a cysteine residue of the GLP-1/GIP dual agonist, for example, to a —SH group of cysteine, but the present disclosure is not limited thereto.

When maleimide-PEG-aldehyde is used, the maleimide group is linked to the —SH group of the GLP-1/GIP dual agonist through a thioether bond, and the aldehyde group may be linked to the biocompatible material, for example, to the $NH_2$ group of the immunoglobulin Fc through a reductive alkylation reaction. However, this method is only an example.

In addition, in the conjugate, the reactive group of the non-peptide polymer may be linked to $—NH_2$ located at the N-terminus of the immunoglobulin Fc region, but this structure is an example only.

Accordingly, the conjugate according to the above aspect may be represented by Formula 1 below:

X-L-F      Formula 1 where X is a GLP-1/GIP dual agonist,
L is a linker;
F is a biocompatible material that increases the half-life of X in vivo, and
- represents a bonding linkage between X and L and a bonding linkage between L and F.

The GLP-1/GIP dual agonist, the linker, and the biocompatible material in Formula 1 are as described above.

L in Formula 1 may be La, where a is 0 or a natural number, wherein, when a is 2 or more, and respective L may each independently from each other.

For example, the linker may be polyethylene glycol (PEG) represented by Formula 2, but is not limited thereto:

Formula 2 where n=10 to 2400, n=10 to 480, or n=50 to 250, but n is not limited thereto.

In the long-acting conjugate, the PEG moiety may include not only a $—(CH_2CH_2O)n$-structure but also an oxygen atom intervening between a linking element and the $—(CH_2CH_2O)n$-, but the present disclosure is not limited thereto.

The polyethylene glycol is a term encompassing all types of ethylene glycol homopolymers, PEG copolymers, and monomethyl-substituted PEG polymers (m PEG), but the present disclosure is not particularly limited thereto.

In an embodiment, - may represent a covalent bonding linkage between X and L or a covalent bonding linkage between L and F.

The GLP-1/GIP dual agonist or a long-acting conjugate thereof has the ability to regulate blood glucose in normal mice and shows the effect of reducing blood glucose and improving insulin resistance in diabetic model rats. Accordingly, the GLP-1/GIP dual agonist or a long-acting conjugate thereof may be used for the prevention or treatment of diabetes.

Another aspect provides a pharmaceutical composition for preventing or treating diabetes including the GLP-1/GIP dual agonist, a pharmaceutically acceptable salt thereof or a solvate thereof, or the conjugate thereof.

The GLP-1/GIP dual agonist, a pharmaceutically acceptable salt thereof or a solvate thereof, or the conjugate thereof is as described above.

The term "prevention" used herein refers to any action that inhibits or delays the onset of a disease by administering the composition.

The term "treatment" used herein refers to any action that alleviates the symptoms of a disease by administration of the composition.

The "diabetes mellitus" is a type of metabolic disease corresponding to a condition in which the secretion of insulin lacks or insulin does not normally function, and is characterized by hyperglycemia in which the concentration of glucose in the blood increases. Hyperglycemia causes various symptoms and signs and excretion of glucose in the urine. Diabetes is divided into type 1 and type 2. Type 1 diabetes was previously called "juvenile diabetes" and is a disease caused by the inability to produce insulin at all. Type 2 diabetes, which is relatively low in insulin, is characterized by insulin resistance (cells are unable to effectively burn glucose due to the decrease in the insulin's ability to lower blood glucose). Type 2 diabetes appears to be largely influenced by environmental factors such as a high-calorie, high-fat, high-protein diet, following a westernized diet, lack of exercise, and stress, and diabetes can also be caused by a defect in a specific gene, and pancreatic surgery, infections, and medications.

In an embodiment, the diabetes may be type 2 diabetes.

The GLP-1/GIP dual agonist or a long-acting conjugate thereof shows the ability to regulate blood glucose in normal mice, and shows reduced blood glucose, reduced HbA1c levels, and improved insulin resistance in diabetic model rats. Accordingly, GLP-1/GIP dual agonist or a long-acting conjugate thereof may be used for prevention or treatment of, in addition to diabetes, diabetic complications, or other diseases associated with insulin resistance and diabetes.

Therefore, alternatively, the pharmaceutical composition may be a pharmaceutical composition for preventing or treating diabetic complications. The "diabetic complications" refer to various pathological symptoms accompanying the long-term high blood glucose state in the body, and may be, for example, retinopathy, renal dysfunction, neuropathy, stroke, arteriosclerosis, cerebral infarction, cerebral thrombosis, myocardial infarction, hypertension, kidney disease, heart disease, diabetic foot ulcers, or cardiovascular disease, but is not limited thereto. When the high blood glucose state is maintained for a long time, the risk of retinopathy, renal dysfunction, neuropathy, stroke, arteriosclerosis, cerebral infarction, cerebral thrombosis, myocardial infarction, hypertension, kidney disease, heart disease, diabetic foot ulcers, or cardiovascular disease is increased. Therefore, blood glucose should be effectively managed to prevent these complications.

Alternatively, the pharmaceutical composition may be a pharmaceutical composition for preventing or treating metabolic syndrome. The metabolic syndrome may be a metabolic syndrome associated with insulin resistance and diabetes. The metabolic syndrome may include dyslipidemia, obesity, and/or hepatic steatosis associated with insulin resistance and diabetes.

The pharmaceutical composition may further include a pharmaceutically acceptable carrier. Pharmaceutically acceptable carriers may include, in the case of oral administration, a binder, a lubricant, a disintegrant, an excipient, a solubilizer, a dispersant, a stabilizer, a suspending agent, a pigment, a flavor, etc.; in the case of injections, a combination of a buffer, a preservative, a painless agent, a solubilizing agent, an isotonic agent, a stabilizer, etc.; and in the case of topical administration, a base, an excipient, a lubricant, a preservative, etc.

In an embodiment, the pharmaceutical composition may further include a pharmaceutically acceptable excipient.

Formulations of the pharmaceutical composition may be variously prepared by mixing with pharmaceutically acceptable carriers as described above. For example, in the case of oral administration, the formulation may be in the form of tablets, troches, capsules, elixirs, suspensions, syrups, wafers, etc., and in the case of injections, the formulation may be prepared in the form of unit dose ampoules or multiple doses. In addition, the formulation may be prepared in the form of solutions, suspensions, tablets, pills, capsules, and sustained-release preparations.

On the other hand, examples of carriers, excipients and diluents suitable for formulation include lactose, dextrose, sucrose, sorbitol, mannitol, xylitol, erythritol, maltitol, starch, acacia, alginate, gelatin, calcium phosphate, calcium silicate, cellulose, methyl cellulose, microcrystalline cellulose, polyvinylpyrrolidone, water, methylhydroxybenzoate, propylhydroxybenzoate, talc, magnesium stearate, or mineral oil may be used. In addition, fillers, anti-coagulants, lubricants, wetting agents, flavoring agents, emulsifiers, and preservatives may be further included.

The pharmaceutical composition may further include one or more other agents for treating diabetes, diabetic complications, or metabolic syndrome. For the formulation, known materials may be used.

The dosage and frequency of the pharmaceutical composition are determined according to the type of drug as an active ingredient, together with various related factors such as the disease to be treated, the route of administration, the age, sex, and weight of the patient, and the severity of the disease.

Since the pharmaceutical composition has excellent in vivo persistence and potency, the number and frequency of administration can be significantly reduced.

Another aspect provides a method of preventing or treating diabetes, including administering an effective amount of the GLP-1/GIP dual agonist, a pharmaceutically acceptable salt thereof, a solvate thereof, or the conjugate thereof, or the pharmaceutical composition to a subject in need thereof.

Alternatively, the method may be a method of preventing or treating diabetic complications.

Alternatively, the method may be a method of preventing or treating metabolic syndrome.

The GLP-1/GIP dual agonist, the pharmaceutically acceptable salt thereof, the solvate thereof, the conjugate, the pharmaceutical composition, diabetes, diabetic complications, and metabolic syndrome are the same as described above.

The "effective amount" or "pharmaceutically effective amount" refers to an amount or dosage of the GLP-1/GIP dual agonist, a pharmaceutically acceptable salt thereof, a solvate thereof, or a conjugate thereof, which, when administered to a patient in a single dose or multiple doses, provides a desired effect in a patient under diagnosis or treatment. The effective amount may be easily determined by the attending physicians as a person skilled in the art by using known techniques or by observing results obtained under similar circumstances. An effective amount for a patient may be determined in consideration of: mammalian species or sizes, age and general health conditions thereof; the specific disease or disorder involved; degree of involvement or severity of the disease or disorder; individual patient responses; specific compounds being administered; administration modes; bioavailability characteristics of the administered agent; the selected dosing regimen; use of concomitant medication; and other relevant circumstances. However, conditions to be considered are not limited thereto, and a number of other factors may be further taken into account by attending physicians.

"Subject" refers to a target in need of treatment of a disease, for example, a mammal such as a human or non-human primate, mouse, rat, dog, cat, horse, and cow.

"Administering" refers to introducing a substance into a patient by any suitable method. The route of administration may be any general route capable of allowing to reach a target in vivo in a patient. The administration may be, for example, intraperitoneal administration, intravenous administration, intramuscular administration, subcutaneous administration, intradermal administration, oral administration, topical administration, intranasal administration, or intrarectal administration, but is not limited thereto.

The administration refers to the administration of the composition according to an embodiment in an amount of 0.0001 mg to 1,000 mg, for example, 0.1 mg to 1,000 mg, 0.1 mg to 500 mg, 0.1 mg to 100 mg, 0.1 mg to 50 mg, 0.1 mg to 25 mg, 1 mg to 1,000 mg, 1 mg to 500 mg, 1 mg to 100 mg, 1 mg to 50 mg, or 1 mg to 25 mg. However, the dosage may be prescribed in various ways depending on factors such as formulation method, administration method, the age, weight, and sex of the patient, pathological condition, food, administration time, administration route, excretion rate, and response sensitivity, and those skilled in the art may appropriately adjust in consideration of these factors. The number of administrations may be once a day or two or more times within the range of clinically acceptable side effects, and administration may be performed at one or two or more sites, daily or at intervals of 2 to 5 days. The number of administration days may be from 1 day to 30 days per treatment. If necessary, the same treatment can be repeated after a titration period. For non-human animals, the same dosage per kg as for humans is used, or the dosage is adjusted based on the volume ratio (for example, average value) of the human organ (heart, etc.) to the organ of the target animal, and then, administered.

In the method, an effective amount of the GLP-1/GIP dual agonist, a pharmaceutically acceptable salt thereof, a solvate thereof, or a conjugate thereof may be administered simultaneously, separately, or sequentially with an effective amount of one or more other active ingredients. The one or more other active ingredients may be one or more other agents for treating inflammatory or autoimmune diseases, but are not limited thereto.

Another aspect provides use of the GLP-1/GIP dual agonist, a pharmaceutically acceptable salt thereof, the solvate thereof, or the conjugate thereof for use in preparing a drug for preventing or treating diabetes.

Alternatively, the use may be for use in preparing a drug for preventing or treating diabetic complications.

Alternatively, the use may be for use in preparing a drug for preventing or treating metabolic syndrome.

The GLP-1/GIP dual agonist, the pharmaceutically acceptable salt thereof, the solvate thereof, the conjugate, the pharmaceutical composition, diabetes, diabetic complications, and metabolic syndrome are the same as described above.

Each description and embodiment disclosed herein may also be applied to other descriptions and embodiments. That is, all combinations of the various elements disclosed herein fall within the scope of the present disclosure. In addition, it cannot be said that the scope of the present disclosure is limited by the specific description described below.

Advantageous Effects

According to one aspect, a GLP-1/GIP dual agonist, or a long-acting conjugate thereof has an increased half-life and exhibits the effects of glycemic control, glycemic reduction, and insulin resistance improvement. Accordingly, the GLP-1/GIP dual agonist, or a long-acting conjugate thereof can be used for the prevention or treatment of diabetes.

BEST MODE

Figure 1:
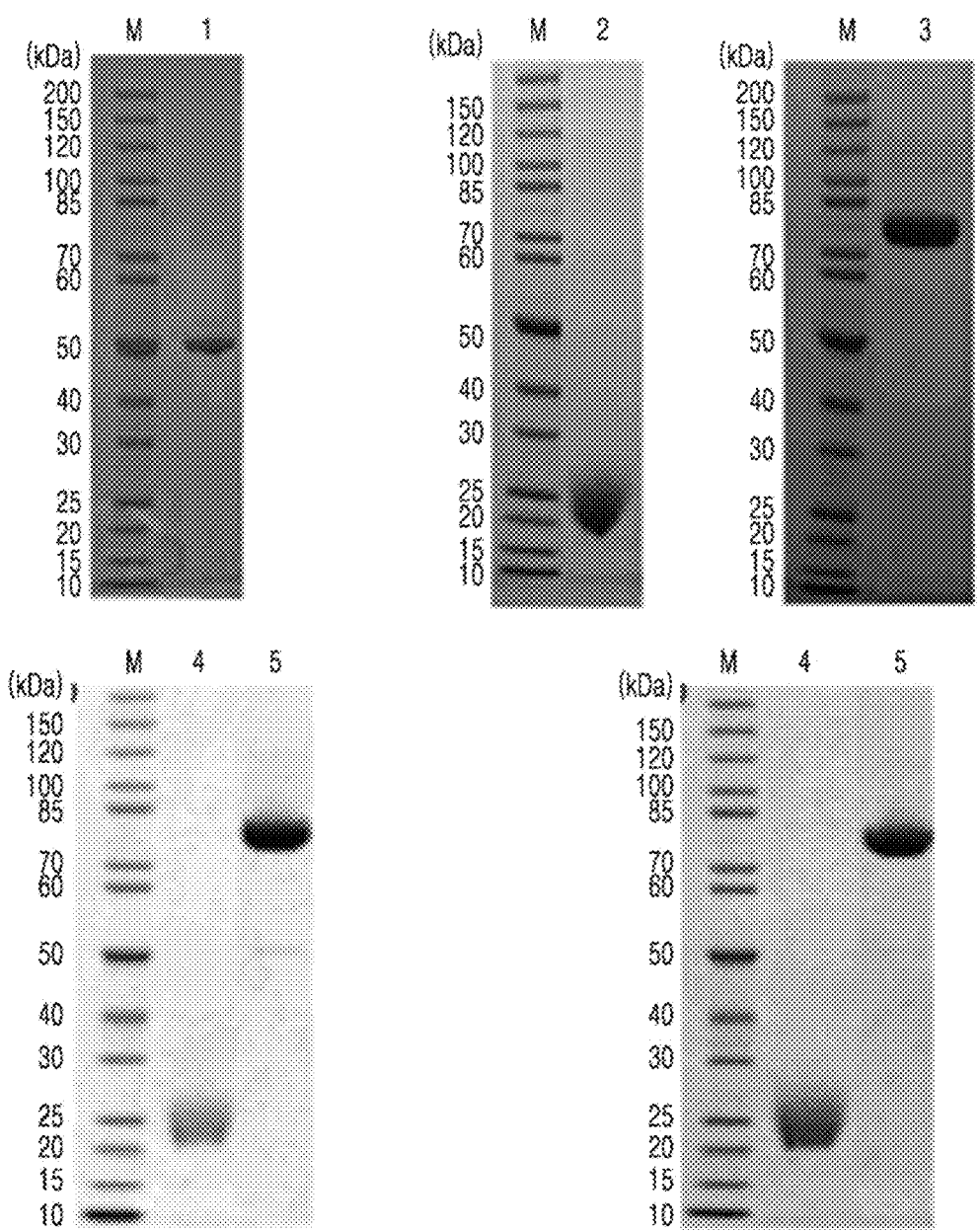
FIG. 1 shows the results of SDS-PAGE analysis of dual agonist-PEG-immunoglobulin Fc region conjugates of SEQ ID NOs: 20, 36, and 40.

Hereinafter, the present disclosure will be described in more detail through examples. However, these examples are intended to illustrate the present disclosure for illustrative purpose, and the scope of the present disclosure is not limited to these examples.

Example 1: Preparation of GLP-1/GIP Dual Agonist Active Against Both GLP-1 Receptor and GIP Receptor A GLP-1/GIP dual agonist having activity against both the GLP-1 receptor and the GIP receptor was prepared and the sequences thereof are shown in Table 1 below.

TABLE 1

| Sequence number | Amino acid sequence | Ring formation |
|---|---|---|
| 1 | YAibEGTFTSDYSEYMEKEAVREFIAWLVKGG PSSGAPPPSC | Ring formation |
| 2 | YAibEGTFTSDYSKYLDEIRAKDFVQWLLDHH PSSGQPPPSC | Ring formation |
| 3 | YAibEGTFTSDYSKYLDEIAAKDFVQWLLDHH PSSGQPPPSC | Ring formation |

TABLE 1-continued

| Sequence number | Amino acid sequence | Ring formation |
|---|---|---|
| 4 | YAibEGTFTSDYSKYLD<u>E</u>IRAK<u>D</u>FVQWLLDHHPSSGQPPPC | Ring formation |
| 5 | YAibEGTFTSDYSKYLD<u>E</u>KAAK<u>D</u>FVQWLLDHHPSSGQPPPSC | Ring formation |
| 6 | YAibEGTFTSDYSKYLD<u>E</u>KRAK<u>D</u>FVQWLLDHHPPSSGQPPPSC | Ring formation |
| 7 | YAibEGTFTSDYSKYLD<u>E</u>RAQ<u>K</u>DFVQWLLDHHPSSGQPPPSC | Ring formation |
| 8 | YAibEGTFTSDYSKYLD<u>E</u>RAS<u>K</u>DFVQWLLDHHPSSGQPPPSC | Ring formation |
| 9 | YAibEGTFTSDYSRYLD<u>E</u>RAA<u>K</u>DFVQWLLDHHPSSGQPPPSK | Ring formation |
| 10 | YAibEGTFTSDYSRYLD<u>E</u>RAQ<u>K</u>DFVQWLLDHHPSSGQPPPSK | Ring formation |
| 11 | YAibEGTFTSDYSRYLD<u>E</u>RAS<u>K</u>DFVQWLLDHHPSSGQPPPSK | Ring formation |
| 12 | YAibEGTFTSDYS<u>E</u>YMEKEAVREFIAWLVRGGPSSGAPPPSK | Ring formation |
| 13 | YAibEGTFTSDYS<u>E</u>YMEKEAVREFISWLVRGGPSSGAPPPSK | Ring formation |
| 14 | HAibEGTFTSDYSKYLDKKRQAibEFVQWLLNGGPSSGAPPPSC | — |
| 15 | YAibEGTFTSDYSIYLD<u>E</u>RA<u>C</u>KDFVQWLLDHHPSSGQPPPSYK | Ring formation |
| 16 | YAibEGTFTSDYSIAibLDKIAQRAFVQWLIAGGPSSGAPPPSK | — |
| 17 | YAibEGTFTSDYSIQLDKIAQKAFVQWLIAGGPSSGAPPPSC | — |
| 18 | YAibEGTFTSDYSIQLDKIAQRAFVQWLIAGGPSSGAPPPSK | — |
| 19 | YAibEGTFTSDYSIYLDKQAAAibAFVQWLIAGGPSSGAPPPSC | — |
| 20 | YAibEGTFTSDYSIAibLDKQAAAibAFVQWLIAGGPSSGAPPPSC | — |
| 21 | YAibEGTFTSDYSIAibLDKIAAKAFVQWLIAGGPSSGAPPPSC | — |
| 22 | YAibEGTFTSDYSKYLD<u>E</u>KAA<u>K</u>EFVQWLLDQHPSSGQPPPSC | Ring formation |
| 23 | YAibEGTFTSDYSKYLD<u>E</u>QAA<u>K</u>EFVQWLLDQHPSSGAPPPSC | Ring formation |
| 24 | YAibEGTFTSDYSKYLD<u>E</u>IAQ<u>K</u>DFVQWLLDQHPSSGAPPPSC | Ring formation |
| 25 | YAibEGTFTSDYSKYLD<u>E</u>EAV<u>K</u>LFVQWLLDQHPSSGAPPPSC | Ring formation |
| 26 | YAibEGTFTSDYSIAMDAIAQQDFVNWLLAQKGKKNDWKHNITQC | — |
| 27 | YAibEGTFTSDYSIAMDAIAQQDFVNWLLAQRGKKSDWKHNITQC | — |
| 28 | YAibEGTFTSDYSIALEKQAQQDFVNWLLAGGPSSGAPPPSC | — |
| 29 | YAibEGTFTSDYSIAibLDKQAAAibEFVNWLLAibGGPSSGAPPPSC | — |
| 30 | YAibEGTFTSDYSIAibLDKQAAAibEFVNWLLAibGHPSSGAPPPSC | — |
| 31 | HPYAibEGTFTSDYSIAibLDKIAQRAFVQWLIAGGPSSGAPPPSK | — |
| 32 | HAYAibEGTFTSDYSIAibLDKIAQRAFVQWLIAGGPSSGAPPPSK | — |
| 33 | CAHYAibEGTFTSDYSIAibLDKIAQRAFVQWLIAGGPSSGAPPPSK | — |
| 34 | YAibEGTFTSDYSIAibLDKQAARAFVQWLIAGGPSSGAPPPSC | — |
| 35 | YAibEGTFTSDYSIAibLDKQHAAibAFVQWLIAGGPSSGAPPPSC | — |
| 36 | YAibEGTFTSDYSIAibLDKQAQQAFVQWLIAGGPSSGAPPPSC | — |
| 37 | YAibEGTFTSDYSIAibLDKQAQQAibFVQWLIAGGPSSGAPPPSC | — |
| 38 | YAibEGTFTSDYSIAibLEKQAQQDFVNWLLAGGPSSGAPPPSC | — |
| 39 | YAibEGTFTSDYSIALEKQAAAibDFVNWLLAGGPSSGAPPPSC | — |
| 40 | YAibEGTFTSDYSIALEKQAQRDFVNWLLAGGPSSGAPPPSC | — |
| 41 | HPYAibEGTFTSDYSIAibLDAQAAAibAFVQWLIAGGPSSGAPPPSK | — |
| 42 | HPYAibEGTFTSDYSIAibLDNleQAAAibAFVQWLIAGGPSSGAPPPSK | — |
| 43 | HPYAibEGTFISDYSIALEAQAQQDFVNWLLAGGPSSGAPPPSK | — |
| 44 | HPYAibEGTFISDYSIALENleQAQQDFVNWLLAGGPSSGAPPPSK | — |

Regarding the sequences shown in Table 1, the underlined amino acids indicate that the underlined amino acids form a ring with each other. In addition, the amino acid labeled Aib is aminoisobutyric acid (Aib), which is a non-native-type amino acid. The amino acid represented by Nle is Norleucine (Nle; 2-aminohexanoic acid), which is an isomer of leucine. In addition, $_{HP}Y$ represents 3-(4-hydroxyphenyl) propanoic acid (HP; Phloretic acid), and tyrosine (Y) at the N-terminus of the peptide is 3-(4-hydroxyphenyl) It is replaced with propionic acid to remove the terminal amino group.

Also, $_{C4}H$ represents 4-imidazoleacetic acid, and histidine (H) at the N-terminus of the peptide is replaced with 4-imidazoleacetic acid to remove the terminal amino group.

In addition, $_{HA}Y$ represents 2-(4-hydroxyphenyl)acetic acid or 4-hydroxyphenylacetic acid (HA), and tyrosine (Y) at the N-terminus of the peptide is replaced with 2-(4-hydroxyphenyl) acetic acid to remove the terminal amino group.

For use as the dual agonist peptide, a dual agonist in which the C-terminus is amidated, may be used, if necessary.

Example 2: Measurement of In Vitro Activity of GLP-1/GIP Dual Agonists

In order to measure the activity of the GLP-1/GIP dual agonist prepared in Example 1, an in vitro cell activity was measured using cell lines transformed with the GLP-1 receptor and the GIP receptor, respectively. The cell lines are transformed to express human GLP-1 and human GIP receptor genes in Chinese hamster ovary (CHO), respectively, and are suitable for measuring the activities of GLP-1 and GIP. Therefore, the activity for each part was measured using each transformed cell line.

To measure the GLP-1 activity of the dual agonist prepared in Example 1, human GLP-1 was diluted from 50 nM to 0.000048 nM by 4-fold serial dilution, and the dual agonist prepared in Example 1 was diluted from 50 nM to 0.000048 nM by 4-fold serial dilution. The culture medium was removed from the cultured human GLP-1 receptor-expressing CHO cells, 5 µl of each of the serially diluted materials was added to the cells, and then 5 µl of buffer containing cAMP antibody was added to the cells, followed by 15 minutes of incubation at room temperature. Then, cells were lysed by adding 10 µl of detection mix containing cell lysis buffer, and reacted at room temperature for 90 minutes. The cell lysate after the reaction had been completed, was applied to the LANCE cAMP kit (PerkinElmer, USA) to calculate the $EC_{50}$ value through the accumulated cAMP, and then compared with each other.

To measure the GIP activity of the dual agonist prepared in Example 1, human GIP was diluted from 50 nM to 0.000095 nM by 4-fold serial dilution, and the dual agonist prepared in Example 1 was diluted from 50 nM to 0.000048 nM by 4-fold serial dilution. The culture medium was removed from the cultured human GIP receptor-expressing CHO cells, 5 µl of each of the serially diluted materials was added to the cells, and then 5 µl of buffer containing cAMP antibody was added to the cells, followed by 15 minutes of incubation at room temperature. Then, cells were lysed by adding 10 µl of detection mix containing cell lysis buffer, and reacted at room temperature for 90 minutes. The cell lysate after the reaction had been completed, was applied to the LANCE cAMP kit (PerkinElmer, USA) to calculate the $EC_{50}$ value through the accumulated cAMP, and then compared with each other.

The relative titer against human GLP-1 and the relative titer against human GIP are shown in Table 2 below.

TABLE 2

| Sequence number | In vitro activity (%) compared to native-type peptide | |
|---|---|---|
| | vs human GLP-1 | vs human GIP |
| 1 | 53.9% | 27.5% |
| 2 | 3.3% | 28.8% |
| 3 | 6.8% | 28.7% |
| 4 | 1.9% | 18.5% |
| 5 | 20.2% | 48.2% |
| 6 | 7.4% | 30.9% |
| 7 | 18.3% | 62.3% |
| 8 | 35.9% | 29.2% |
| 9 | 141.0% | n/a |
| 10 | 108.0% | n/a |
| 11 | 95.0% | n/a |
| 12 | 110.0% | n/a |
| 13 | 116.0% | n/a |
| 14 | 159.7% | 0.3% |
| 15 | 97.5% | 64.4% |
| 16 | 60.0% | 72.3% |
| 17 | 19.8% | 7.7% |
| 18 | 43.3% | 15.9% |
| 19 | 32.8% | 13.9% |
| 20 | 31.5% | 64.2% |
| 21 | 19.7% | 23.2% |
| 22 | 41.1% | 39.6% |
| 23 | 13.5% | 105.6% |
| 24 | 7.3% | 83.9% |
| 25 | 3.2% | 59.4% |
| 26 | 0.3% | 57.9% |
| 27 | 0.2% | 55.5% |
| 28 | 6.7% | 145.8% |
| 29 | 0.5% | 96.0% |
| 30 | 1.0% | 63.4% |
| 31 | 93.3% | 38.3% |
| 32 | 88.3% | 20.1% |
| 33 | 3.1% | 14.8% |
| 34 | 34.2% | 63.4% |
| 35 | 9.6% | 64.2% |
| 36 | 79.9% | 217.2% |
| 37 | 45.2% | 173.9% |
| 38 | 14.3% | 216.1% |
| 39 | 15.9% | 143.6% |
| 40 | 97.7% | 181.1% |
| 41 | 116.9% | 58.7% |
| 42 | 69.5% | 35.9% |
| 43 | 1.2% | 109.4% |
| 44 | 1.4% | 74.2% | n/a indicates that no activity was obtained after testing. As such, the novel dual agonist prepared in Example 1 has activity for the GLP-1 receptor and the GIP receptor.

Example 3: Preparation of Long-Acting Conjugates of Dual Agonists

A long-acting conjugate containing the dual agonist prepared in Example 1 was prepared. Specifically, the dual agonists of SEQ ID NOs: 20, 36, and 40 were each linked to an immunoglobulin Fc region through a non-peptidic polymer, PEG.

Specifically, in order to PEGylate MAL-10K PEG-ALD (10 kDa PEG having a maleidmide group and a propionaldehyde group at oppose ends thereof, NOF, Japan) to a dual agonist, the reaction was caused to occur for 1 hour to 2 hours by adding isopropanol in such conditions that the molar ratio of the dual agonist (SEQ ID NOs: 20, 36, and 40) prepared in Example 1 and PEG was 1: 1 to 2, the protein concentration was 2 mg/mL to 5 mg/mL, the pH was 6.5 to 7.5, and the temperature was 4° C. to 10° C. The reaction solution was applied to an SP Sepharose High Performance (GE Healthcare Life Science, USA) column to purify monopegylated dual agonists.

The purified mono-PEGylated dual agonist was reacted with immunoglobulin Fc at a molar ratio of 1:2-10, at the total protein concentration of 20 mg/ml-50 mg/ml, at the pH of 6.0-7.0, and at 4° C.-10° C. for 14 hours to 18 hours. At this time, isopropanol and sodium cyanoborohydride ($NaCNBH_3$) as a reducing agent were added as the reaction solution.

The reaction solution was subjected to a Source 15Q (GE Healthcare Life Science, USA) column so as to purifity a conjugate in which GLP-1R/GIPR dual agonist was covalently linked to immunoglobulin Fc by PEG.

As a result, it was confirmed by SE-HPLC, RP-HPLC analysis that the dual agonist of SEQ ID NO: 20-PEG-immunoglobulin Fc region conjugate (hereinafter, referred to as 'long-acting conjugate of SEQ ID NO: 20') and the dual agonist of SEQ ID NO: 36-PEG-immunoglobulin Fc region conjugate (hereinafter, referred to as long-acting conjugate of SEQ ID NO: 36'), and the dual agonist of SEQ ID NO: 40-PEG-immunoglobulin Fc region conjugate (hereinafter, referred to as 'long-acting conjugate of SEQ ID NO: 40') were prepared with a high purity of 95% or more. SDS-PAGE analysis results are shown in FIG. 1.

Example 4: In Vitro Activity Measurement of Long-Acting Dual Agonist Conjugate

In order to measure the activity of the long-acting conjugate of SEQ ID NOs: 20, 36, and 40 prepared in Example 3, the cell activity in vitro was measured using cell lines transformed with the GLP-1 receptor and the GIP receptor, respectively, in the same manner as in Example 2.

The cell lines were transformed to express the human GLP-1 receptor and the human GIP receptor genes in Chinese hamster ovary (CHO), respectively, and were each the same cell line used in Example 2. Activity for each part was measured using each transformed cell line.

To measure the GLP-1 activity of the long-acting conjugates of SEQ ID NOs: 20, 36, and 40 prepared in Example 3, human GLP-1 was diluted from 50 nM to 0.000048 nM by 4-fold serial dilution, and the long-acting conjugates of SEQ ID NOs: 20 and 36, and 40 were diluted from 12.5 nM to 0.000012 nM by 4-fold serial dilution. The culture medium was removed from the cultured human GLP-1 receptor-expressing CHO cells, 5 µl of each of the serially diluted materials was added to the cells, and then 5 µl of buffer containing cAMP antibody was added to the cells, followed by 15 minutes of incubation at room temperature. Then, cells were lysed by adding 10 µl of detection mix containing cell lysis buffer, and reacted at room temperature for 90 minutes. The cell lysate after the reaction had been completed, was applied to the LANCE cAMP kit (PerkinElmer, USA) to calculate the $EC_{50}$ value through the accumulated cAMP, and then compared with each other.

To measure the GIP activity of the long-acting conjugates of SEQ ID NOs: 20, 36, and 40 prepared in Example 3, human GIP was diluted from 50 nM to 0.000095 nM by 4-fold serial dilution, and the long-acting conjugates of SEQ ID NOs: 20 and 36, and 40 were diluted from 12.5 nM to 0.000012 nM by 4-fold serial dilution. The culture medium was removed from the cultured human GIP receptor-expressing CHO cells, 5 µl of each of the serially diluted materials was added to the cells, and then 5 µl of buffer containing cAMP antibody was added to the cells, followed by 15 minutes of incubation at room temperature. Then, cells were lysed by adding 10 µl of detection mix containing cell lysis buffer, and reacted at room temperature for 90 minutes. The cell lysate after the reaction had been completed, was applied to the LANCE cAMP kit (PerkinElmer, USA) to calculate the $EC_{50}$ value through the accumulated cAMP, and then compared with each other.

The relative titer against human GLP-1 and the relative titer against human GIP are shown in Table 3.

TABLE 3

| Sequence number | In vitro activity compared to native peptide (%) | |
|---|---|---|
| | vs human GLP-1 | vs human GIP |
| 20 | 7.5% | 62.1% |
| 36 | 3.9% | 26.9% |
| 40 | 10.1% | 24.7% |

Example 5: Confirmation of Glycemic Control Effect of Long-Acting Dual-Agonist Conjugate in Normal Mice (ipGTT)

Normal male C57BL/6 mice (Orient Bio, Korea) were used to measure the in vivo effect of the composition including the long-acting conjugates of SEQ ID NOs: 20, 36, and prepared in Example 3.

Seven-week-old mice were acclimatized for about 4 to 6 days and then used for the test, and were separated into 4 groups of G1, G2, G3 and G4, 6 mice per group. The groups include a control group to which nothing was administered to the groups (Vehicle), a group administered with the long-acting conjugate of SEQ ID NO: 20 (1 nmol/kg), a group administered with the long-acting conjugate of SEQ ID NO: 36 (1 nmol/kg), and a group administered with the long-acting conjugate of SEQ ID NO: 40 (1 nmol/kg). The test substance was administered subcutaneously, and after 20 hours, fasting was given for 4 hours. For the intraperitoneal glucose tolerance test (ipGTT) test, 1 g/kg of glucose was intraperitoneally administered, and then, 1-2 drops of blood, obtained by puncturing the tail vein with a 26 G syringe, were used to measure blood glucose of mouse by using a blood glucose analyzer (OneTouch Ultra, LifeScan, Inc., USA). Blood glucose was measured before glucose administration, 15 minutes, 30 minutes, 1 hour, and 2 hours after administration.

Figure 2A:
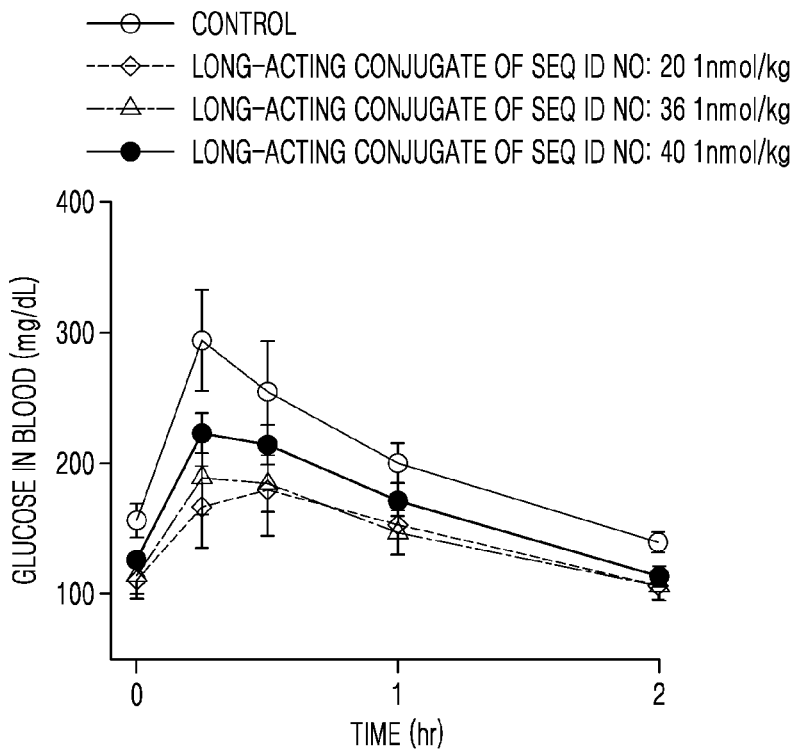
FIG. 2A shows the results of confirming the effect of the long-acting conjugates of SEQ ID NOs: 20, 36, and 40 on glycemic control in normal mice.

FIG. 2A shows the results of confirming the effect of the long-acting conjugates of SEQ ID NOs: 20, 36, and 40 on glycemic control in normal mice.

Figure 2B:
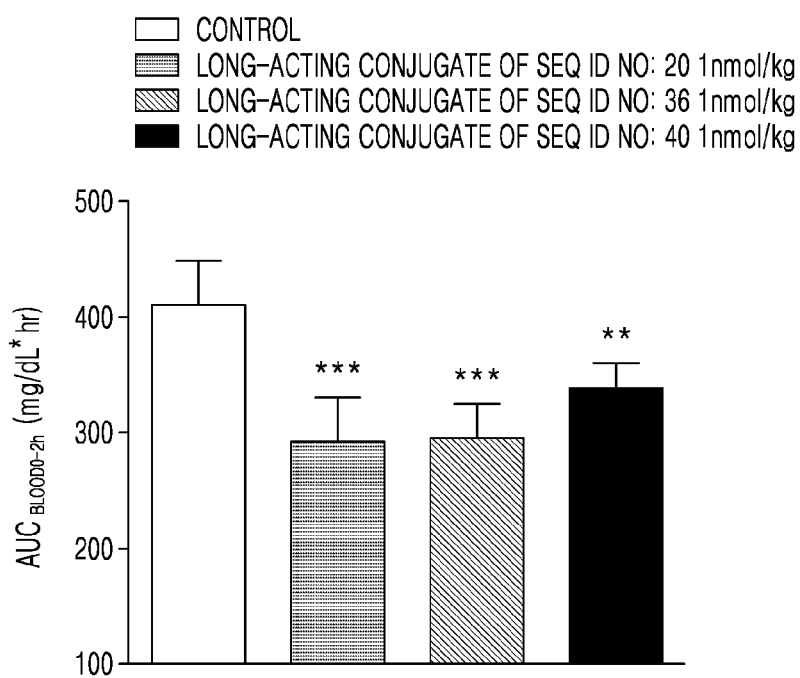
FIG. 2B shows the results of confirming the effect of the long-acting conjugates of SEQ ID NOs: 20, 36, and 40 on glycemic control in normal mice.

FIG. 2B shows the results of confirming the effect of the long-acting conjugates of SEQ ID NOs: 20, 36, and 40 on glycemic control in normal mice.

As shown in FIGS. 2A and 2B, it was confirmed that all of the long-acting conjugates of SEQ ID NOs: 20, 36, and 40 showed significantly improved glycemic control ability compared to the control group in the glucose tolerance test.

Example 6: Confirmation of Glycemia Reduction Effect and Insulin Resistance Improvement in DIO/STZ Rats of Long-Acting Dual Agonist Conjugate In order to measure the in vivo effect of the composition including the long-acting conjugate of SEQ ID NO: 20 prepared in Example 3, type 2 diabetes model DIO/STZ rats were used.

Seven-week-old normal male SD rats (Orient Bio, Korea) were fed a high-fat diet, D12492 (Rodent Diet With 60 kcal % Fat, Research diet Inc., USA) for 2 weeks, and then STZ, which can destroy pancreatic beta cells, was administered twice a week at a dose of 30 mg/kg to prepare DIO/STZ rats. The fabricated model continued to consume a high-fat diet to maintain diabetes. Diabetes-induced rats were divided into three groups, G1, G2 and G3, according to blood glucose level. The groups were divided into a control group (Vehicle) to which nothing was administered to the above groups, a group administered with a low dose of the long-acting conjugate of SEQ ID NO: 20 (3.0 nmol/kg/Q3D), and a group administered with a high dose of the long-acting conjugate of SEQ ID NO: 20 (14.8 nmol/kg/Q3D).

In addition, blood glucose and HbA1c were measured while the test substance was repeatedly administered for 5 weeks. Blood glucose was measured using a blood glucose analyzer (OneTouch Ultra, LifeScan, Inc., USA) using 1-2 drops of blood, obtained by puncturing the tail vein with a 26 G syringe, and HbA1c was measured using a diabetes diagnosis instrument (DCA Vantage, Siemens AG, Germany).

A homeostatic model assessment-insulin resistance (HOMA-IR) was calculated by measuring the rat insulin concentration in blood after repeated administration for 5 weeks using an ELISA kit (Rat Ultrasensitive Insulin ELISA, Alpco, USA). HOMA-IR is the most representative test and indicator that is used to confirm insulin resistance.

Figure 3A:
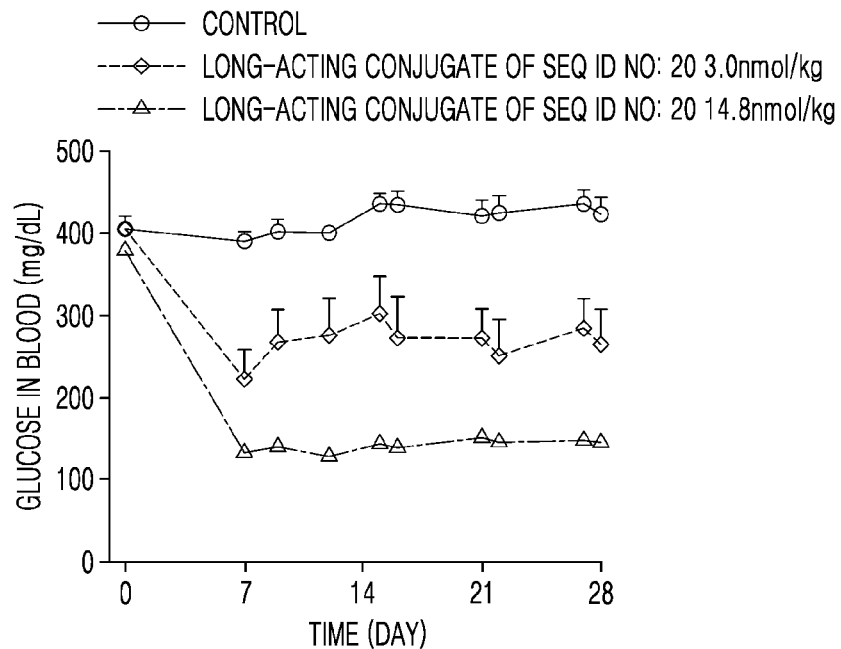
FIG. 3A shows the results of confirming the effect of the long-acting conjugate of SEQ ID NO: 20 on the decrease in blood glucose in a type 2 diabetes model.

FIG. 3A shows the results of confirming the effect of the long-acting conjugate of SEQ ID NO: 20 on the decrease in blood glucose in a type 2 diabetes model.

Figure 3B:
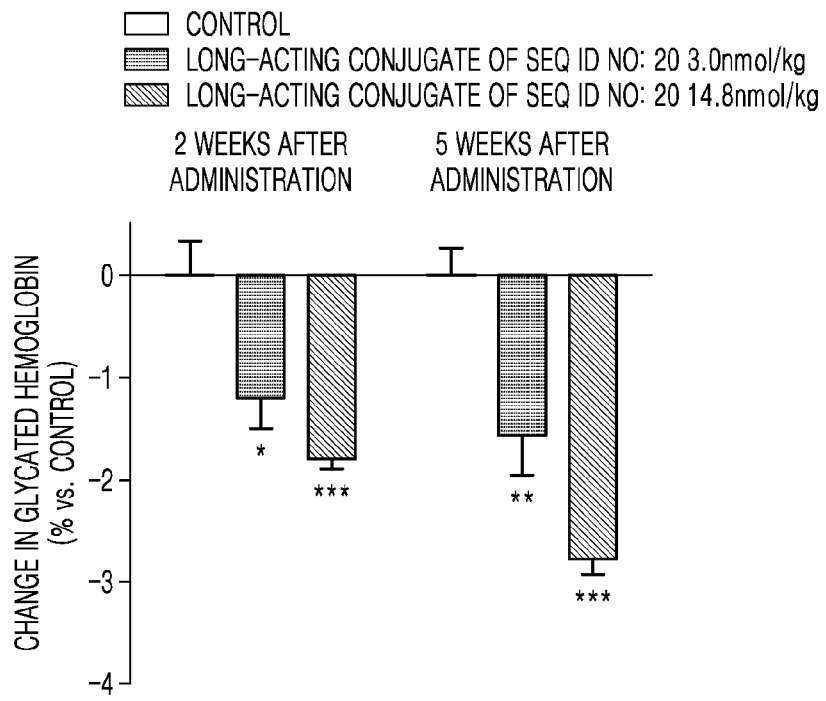
FIG. 3B shows the results of confirming the effect of the long-acting conjugate of SEQ ID NO: 20 on the decrease in the value of HbA1c in a type 2 diabetes model.

FIG. 3B shows the results of confirming the effect of the long-acting conjugate of SEQ ID NO: 20 on the decrease in the value of HbA1c in a type 2 diabetes model.

As shown in FIGS. 3A and 3B, glycemia reduction was confirmed when the long-acting conjugate according to an embodiment was administered to DIO/STD rats for 5 weeks. HbA1c levels also decreased. The glycemia reduction effect was increased in proportion to the administered dose, and glycated hemoglobin was decreased in proportion to the administration period and administration dose. These results show that the dual agonist according to an embodiment is directly involved in the glycemia reduction.

Figure 4:
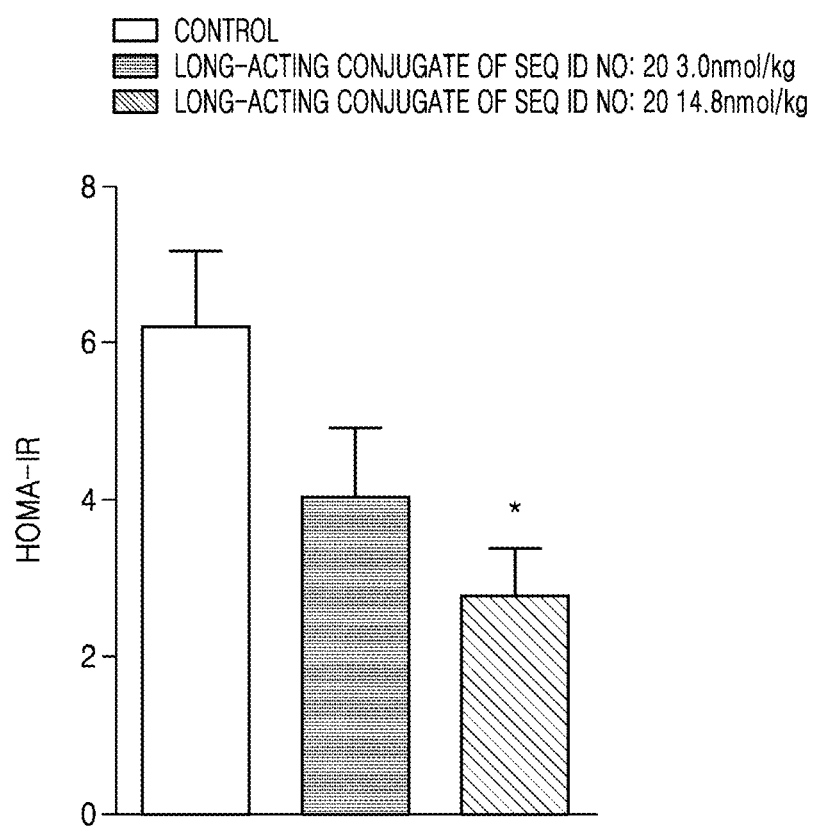
FIG. 4 shows the results of confirming the insulin resistance improvement effect of the long-acting conjugate of SEQ ID NO: 20 in a type 2 diabetes model.

FIG. 4 shows the results of confirming the insulin resistance improvement effect of the long-acting conjugate of SEQ ID NO: 20 in a type 2 diabetes model.

As shown in FIG. 4, it was confirmed that the insulin resistance improvement effect was significantly improved when the long-acting conjugate was administered to DIO/STZ rats for 5 weeks.

The invention claimed is:

1. A peptide comprising an amino acid sequence selected from the group consisting of SEQ ID NOs: 1 to 44.

2. The peptide of claim 1, wherein the peptide includes an amino acid sequence selected from the group consisting of SEQ ID NOs: 14, 15, 16, 20, 36, 37, 38, and 40.

3. The peptide of claim 1, wherein the peptide includes an amino acid sequence selected from the group consisting of SEQ ID NOs: 20, 36, and 40.

4. The peptide of claim 1, wherein the peptide has activity against a glucagon-like peptide-1 (GLP-1) receptor and a glucose-dependent insulinotropic peptide (GIP) receptor.

5. The peptide of claim 1, wherein a 12th amino acid and a 16th amino acid, or a 16th amino acid and a 20th amino acid, from the N-terminus of the sequence of the peptide, form a ring with each other.

6. The peptide of claim 1, wherein the peptide is unmodified or amidated at the C-terminus thereof.

7. A polynucleotide encoding the peptide of claim 1.

8. A vector comprising the polynucleotide of claim 7.

9. A conjugate in which the peptide according to claim 1 is combined with a biocompatible material that increases half-life in vivo.

10. The conjugate of claim 9, wherein the biocompatible material is selected from the group consisting of high-molecular-weight polymers, fatty acids, cholesterol, albumin and fragments thereof, albumin binding substances, polymers of repeating units of specific amino acid sequences, antibodies, antibody fragments, FcRn binding substances, in vivo connective tissues, nucleotides, fibronectin, transferrin, saccharides, heparin, and elastin.

11. The conjugate of claim 10, wherein the high-molecular-weight polymers are selected from the group consisting of polyethylene glycol, polypropylene glycol, ethylene glycol-propylene glycol copolymers, polyoxyethylated polyols, polyvinyl alcohol, polysaccharides, polyvinyl ethyl ether, biodegradable polymers, lipid polymers, chitin, hyaluronic acid, oligonucleotides, and combinations thereof.

12. The conjugate of claim 9, wherein the biocompatible material is an FcRn binding material.

13. The conjugate of claim 12, wherein the FcRn binding material is an immunoglobulin Fc region.

14. The conjugate of claim 13, wherein the immunoglobulin Fc region is selected from the group consisting of: (a) a CH1 domain, a CH2 domain, a CH3 domain, and a CH4 domain; (b) a CH1 domain and a CH2 domain; (c) a CH1 domain and a CH3 domain; (d) a CH2 domain and a CH3 domain; (e) a combination of one or more of the CH1 domain, the CH2 domain, the CH3 domain and the CH4 domain with an immunoglobulin hinge region or a portion of a hinge region; and (f) a dimer between each domain of a heavy chain constant region and a light chain constant region.

15. The conjugate of claim 13, wherein the immunoglobulin Fc region is aglycosylated.

16. The conjugate of claim 13, wherein the immunoglobulin Fc region is an IgG4 Fc region.

17. The conjugate of claim 13, wherein the immunoglobulin Fc region is an aglycosylated Fc region derived from human IgG4.

18. The conjugate of claim 9, wherein the peptide is linked to a biocompatible material by a linker.

19. The conjugate of claim 18, wherein the linker is selected from the group consisting of peptides, fatty acids, saccharides, high-molecular-weight polymers, low-molecular weight compounds, nucleotides, and combinations thereof.

20. The conjugate of claim 19, wherein the high-molecular-weight polymers are selected from the group consisting of polyethylene glycol, polypropylene glycol, ethylene glycol-propylene glycol copolymers, polyoxyethylated polyols, polyvinyl alcohol, polysaccharides, polyvinyl ethyl ether, biodegradable polymers, lipid polymers, chitin, hyaluronic acid, oligonucleotides, and combinations thereof.

21. The conjugate of claim 18, wherein the linker contains an ethylene glycol repeating unit.

22. The conjugate of claim 21, wherein a formula weight of the ethylene glycol repeating unit is in the range of 1 kDa to 100 kDa.

23. A pharmaceutical composition for preventing or treating diabetes, comprising (a) the peptide of claim 1, a pharmaceutically acceptable salt thereof or a solvate thereof, or (b) a conjugate comprising the peptide of claim 1 and a biocompatible material that increases half-life in vivo and is linked to the peptide.

24. A method for treating or preventing or treating diabetes in a subject in need thereof, comprising administering to the subject an effective amount of (a) the peptide of claim 1 or a pharmaceutically acceptable salt thereof or a solvate thereof, or (b) a conjugate comprising the peptide of claim 1 and a biocompatible material that increases half-life in vivo and is linked to the peptide.

* * * * *